United States Patent
Nix

(10) Patent No.: US 12,244,696 B2
(45) Date of Patent: *Mar. 4, 2025

(54) ECDHE KEY EXCHANGE FOR SERVER AUTHENTICATION AND A KEY SERVER

(71) Applicant: IoT and M2M Technologies, LLC, Evanston, IL (US)

(72) Inventor: John A Nix, Evanston, IL (US)

(73) Assignee: IoT and M2M Technologies, LLC, Evanston, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/602,866

(22) Filed: Mar. 12, 2024

(65) Prior Publication Data
US 2024/0267206 A1    Aug. 8, 2024

Related U.S. Application Data

(63) Continuation of application No. 18/210,776, filed on Jun. 16, 2023, now Pat. No. 11,943,343, which is a
(Continued)

(51) Int. Cl.
*H04L 9/32* (2006.01)
*H04L 9/00* (2022.01)
(Continued)

(52) U.S. Cl.
CPC ............ *H04L 9/0841* (2013.01); *H04L 9/006* (2013.01); *H04L 9/0662* (2013.01);
(Continued)

(58) Field of Classification Search
CPC ..... H04L 9/0841; H04L 9/006; H04L 9/0662; H04L 9/0825; H04L 9/085; H04L 9/14; H04L 9/3066; H04L 9/3247; H04L 9/3263
See application file for complete search history.

(56) References Cited

U.S. PATENT DOCUMENTS 8,761,401 B2   6/2014   Sprunk et al.
8,782,774 B1   7/2014   Pahl et al.
(Continued)

OTHER PUBLICATIONS

Alka Sawlikar, Point Multiplication method for Elliptic Curve Cryptography, Jan. 2012, International Journal of Engineering and Innovative Technology. (Year: 2012), pp. 1-4.
(Continued)

*Primary Examiner* — Joseph P Hirl
*Assistant Examiner* — Aayush Aryal
(74) *Attorney, Agent, or Firm* — GrowIP Law Group LLC

(57) ABSTRACT

A server can receive a device public key and forward the device public key to a key server. The key server can perform a first elliptic curve Diffie-Hellman (ECDH) key exchange using the device public key and a network private key to derive a secret X1. The key server can send the secret X1 to the server. The server can derive an ECC PKI key pair and send to the device the server public key. The server can conduct a second ECDH key exchange using the derived server secret key and the device public key to derive a secret X2. The server can perform an ECC point addition using the secret X1 and secret X2 to derive a secret X3. The device can derive the secret X3 using (i) the server public key, a network public key, and the device private key and (ii) a third ECDH key exchange.

13 Claims, 10 Drawing Sheets

Related U.S. Application Data continuation of application No. 17/253,111, filed as application No. PCT/US2019/037911 on Jun. 19, 2019, now Pat. No. 11,683,163.

(60) Provisional application No. 62/687,411, filed on Jun. 20, 2018.

(51) Int. Cl.
  *H04L 9/06* (2006.01)
  *H04L 9/08* (2006.01)
  *H04L 9/14* (2006.01)
  *H04L 9/30* (2006.01)

(52) U.S. Cl.
  CPC ............ *H04L 9/0825* (2013.01); *H04L 9/085* (2013.01); *H04L 9/14* (2013.01); *H04L 9/3066* (2013.01)

(56) References Cited

U.S. PATENT DOCUMENTS

| | | | |
|---|---|---|---|
| 9,553,856 B2 | 1/2017 | Pahl et al. | |
| 9,628,268 B2 | 4/2017 | Kiang et al. | |
| 10,129,224 B2 | 11/2018 | Pahl et al. | |
| 11,184,157 B1 | 11/2021 | Gueron et al. | |
| 2007/0009103 A1* | 1/2007 | Zhu | H04L 9/0841 380/270 |
| 2008/0260153 A1* | 10/2008 | Almeida | H04L 9/0841 380/259 |
| 2009/0068985 A1* | 3/2009 | Nguyen | H04L 9/0844 455/411 |
| 2014/0010371 A1 | 1/2014 | Khazan et al. | |
| 2015/0067338 A1* | 3/2015 | Gero | H04L 63/061 713/171 |
| 2015/0372811 A1* | 12/2015 | Le Saint | H04L 9/3228 705/76 |
| 2016/0014114 A1 | 1/2016 | Pahl et al. | |
| 2017/0111179 A1 | 4/2017 | Gero et al. | |
| 2017/0237571 A1 | 8/2017 | Pahl et al. | |
| 2018/0026784 A1 | 1/2018 | Ward et al. | |

OTHER PUBLICATIONS

Blake-Wilson et al., "Key Agreement Protocols and their Security Analysis", Sept. 9, 1997, Sixth IMA International Conference on Cryptography and Coding, pp. 1-35.
European Technical Standards Institute (ETSI), "Meeting #81 document SCP(17)000188", Dec. 5, 2017, pp. 1-10.
GSM Association, "iUICC POC Group Primary Platform requirements", Release 1.0, May 17, 2017, pp. 1-43.
Mark Wolfe, What is HMAC Authentication and why is it useful?, Oct. 20, 2012 (Year: 2012), pp. 1-6.
National Institute of Standards and Technology (NIST) document "NIST SP 800-56A, Recommendation for Pair-Wise Key Establishment Schemes Using Discrete Logarithm Cryptography", Mar. 2007, pp. 1-152.
PCT/US2019/037911, International Search Report, mailed Sep. 26, 2019, pp. 1-2.
Putman, "ECDH-based Authentication using Pre-Shared Asymmetric Keypairs for (Datagram) Transport Layer Security ((D)TLS) Protocol version 1.2", IETF TLS Working Group, Nov. 30, 2017, pp. 1-12.
Turner et al, "Use of Elliptic Curve Cryptography (ECC) Algorithms in Cryptographic Message Syntax (CMS)", IETF RFC 5753, Jan. 2010, pp. 1-61.
Vivek Kapoor, Elliptic Curve Cryptography, May 20-26, 2008, ACM Ubiquity (Year: 2008), pp. 1-8.
WiFi Alliance, Device Provisioning Protocol Specification Version 1.0, Apr. 9, 2018, pp. 1-124.
Wikipedia, "Elliptic curve point multiplication", May 15, 2018, pp. 1-7.
Wikipedia, "Elliptic Curve Diffie-Hellman", Mar. 9, 2018, pp. 1-2.

* cited by examiner

Figure 2d

Server Database 101d

| Random 1 202a | Ed 103a | Parameters 104a | Source IP:Port 203a | H(PK network) 102a | ID key-server 102i | X1 211a | E1 101a | e1 101b | X2 212a | X3 215 | K1 216a | Radom 2 205r |
|---|---|---|---|---|---|---|---|---|---|---|---|---|
| 202a-1 | 103a-1 | 104a-1 | 203a-1 | 250 | 102i-1 | 211a-1 | 101a-1 | 101b-1 | 212a-1 | 215-1 | 216a-1 | 205r-1 |
| 202a-2 | 103a-2 | 104a-3 | 203a-2 | 250-1 | 102i-2 | 211a-2 | 101a-2 | 101b-2 | 212a-2 | 215-2 | 216a-2 | 205r-2 |
| 202a-3 | 103a-3 | 104a-1 | 203a-3 | 250-2 | 102i-2 | 211a-3 | 101a-3 | 101b-3 | 212a-3 | 215-3 | 216a-3 | 205r-3 |

Cryptographic Parameters 104

| Set 104a | PKI Key Length 104b | Curve 104c | Hash 104d | Symmetric Ciphering Key Length 104e | Symmetric Ciphering Parameters 104f | Random Length 104g |
|---|---|---|---|---|---|---|
| A | 256 | p256 | SHA-256 | 256 | C1 | 128 |
| B | 384 | p384 | SHA-384 | 384 | C2 | 192 |
| C | 512 | secp521r1 | SHA-512 | 512 | C3 | 256 |
| D | 384 | Curve25519 | SHA-3 | 384 | C4 | 192 |

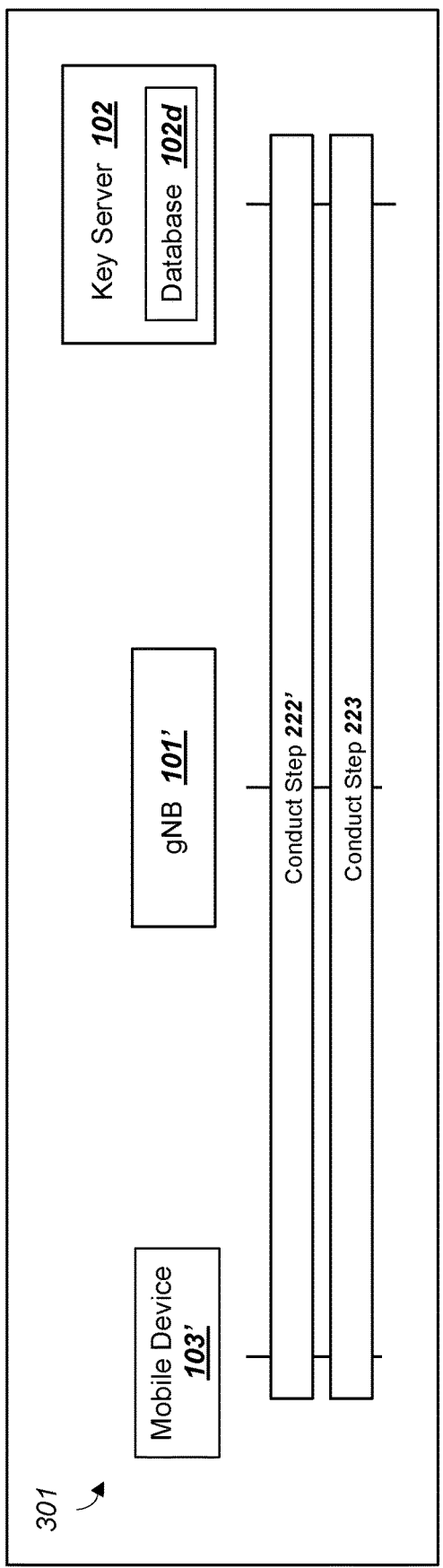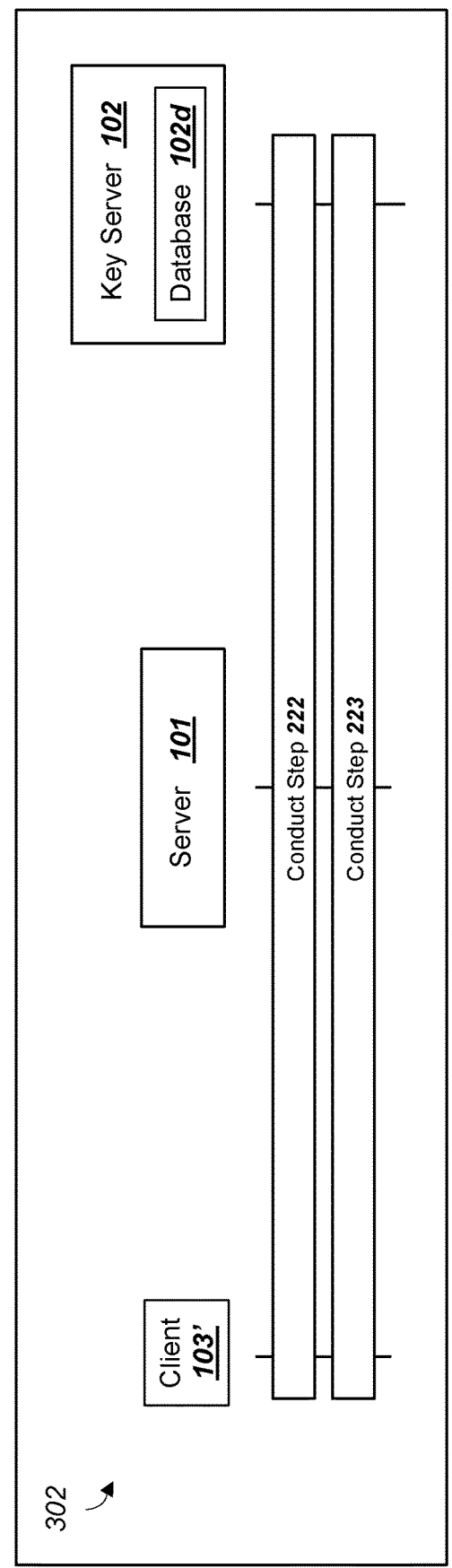

ECDHE KEY EXCHANGE FOR SERVER AUTHENTICATION AND A KEY SERVER

CROSS-REFERENCE TO RELATED APPLICATIONS

This is a U.S. Continuation Application of U.S. Nonprovisional application Ser. No. 18/210,776, filed Jun. 16, 2023, that claims the benefit of the filing date of U.S. Non-provisional application Ser. No. 17/253,111, filed Dec. 16, 2020, and that issued as U.S. Pat. No. 11,683,163 on Jun. 20, 2023, that claims the benefit of the filing date of International PCT Application Serial No. PCT/US19/37911, filed Jun. 19, 2019, that claims the benefit of the filing date of U.S. Provisional Patent Application Ser. No. 62/687,411, filed Jun. 20, 2018, which are all hereby incorporated by reference in their entirety.

BACKGROUND

Technical Field

The present systems and methods relate to conducting an ephemeral elliptic curve Diffie Hellman key exchange (ECDHE) with authentication and multiple parties, and more particularly to communications between a computing device, a server, and a key server over a network in order for the computing device and the server to mutually derive a symmetric ciphering key with authentication of the server.

Description of Related Art

The use of elliptic curve cryptography (ECC) for computing devices has expanded over the past decade and is also expected to continue to grow. Many applications use or propose using ephemeral elliptic curve Diffie Hellman (ECDHE) key exchanges in order to derive a symmetric ciphering key. Prominent examples today include embedded universal integrated circuit cards (eUICCs) also known as embedded SIMs, Transport Layer Security (TLS) version 1.3 from the Internet Engineering Task Force (IETF), and the Device Provisioning Protocol (DPP) from the WiFi Alliance™. Other examples are expected in the future as well, such as the use of ECDHE in order to protect the Subscription Permanent Identifier (SUPI) for 5G mobile networks, where the SUPI is equivalent to an International Mobile Subscriber Identity (IMSI). ECDHE can be considered a subset of elliptic curve Diffie-Hellman key exchanges (ECDH), where ECDHE key exchanges use at least one ephemeral on short-term elliptic curve PKI key pair. Applications use ECDHE key exchanges in order for two nodes to mutually derive a symmetric ciphering key and a message authentication code (MAC) key using a key derivation function. The symmetric ciphering key can subsequently be used with a symmetric ciphering algorithm such as the Advanced Encryption Standard (AES) and the MAC key can be used to verify message integrity. In this manner, secure communication can be established between two nodes.

ECDHE key exchanges depend on a first node deriving a first ephemeral private and public key pair and a second node deriving or using a second private and public key, where the public key infrastructure (PKI) keys use a common elliptic curve. The elliptic curve can be specified in parameters that define a named curve such as secp256r1 (p256), secp256k1, secp385r1, etc., and many other possibilities exist as well. ECDHE key exchanges have multiple benefits over older generation technology such as Diffie Hellman key exchanges. With ECDHE, elliptic curve cryptography can be utilized with shorter keys and faster processing times compared to previous technology, for the equivalent level of security or bit length of keys. For example, a 256 bit ECC PKI key pair can be used to obtain a comparable level of security as that obtained from using a 3072 bit RSA based PKI key pair. Calculation or processing time for conducting an ECDHE key exchange can also be faster than a traditional Diffie Hellman key exchange for the same level of security, as defined by the resulting key length of a derived shared secret from the key exchange.

Although the use of ECDHE key exchanges is growing rapidly, improvements can be made for ECDHE key exchanges in order to further enhance security and also leverage existing keys that may be recorded by the nodes participating in an ECDHE key exchange. As one example, an ECDHE key exchange as contemplated for (a) the exemplary applications and standards from two paragraphs above do not normally (b) provide authentication of either node. Separate steps than an ECDHE key exchange have to be conducted in order to authenticate endpoints, such as using an elliptic curve digital signature algorithm (ECDSA) with static or long-term ECC PKI keys recorded by the nodes. ECDSA algorithms also have challenges, where the reuse of a value k for two different signatures can reveal the private key. As another example and related to the authentication issue above, an ECDHE is susceptible to "man in the middle" attacks, where an intermediate node or different node than the intended node can perform the ECDHE key exchange instead of the intended node. Thus, although ECDHE can securely establish a symmetric ciphering key for confidentiality of data communications, the confidentiality could be established with a party or node that is not the intended recipient of the confidential communications. Consequently, a need exists in the art for the intended two nodes for confidential communications to use an ECDHE key exchange in a manner where at least one of the two nodes can be authenticated.

A primary goal of ECDHE key exchanges is also to obtain forward secrecy, where an ECDHE key exchange can periodically be re-conducted in order to rotate or re-establish a new symmetric ciphering key. In this manner, if a private key is compromised then only the subset of historical data encrypted using the compromised private key is subject to decryption, and other communications using a different private key can remain secured. An authenticated ECDH key exchange can be conducted using at least one static PKI key pair (e.g. not an ephemeral key exchange with ephemeral PKI keys), but without the benefits of forward secrecy. A need exists in the art where two parties can conduct an authenticated ECDHE key exchange (e.g. by using ephemeral PKI keys) in order to obtain the benefits of forward secrecy.

The use of ECDH key exchanges (e.g. with at least one static PKI key pair) is also subject to greater security risks over time, where repeated use of one static PKI key pair is subject to cryptographic analysis and "leakage" of equivalent bits of security over time. Further, the use of ECDH key exchanges with one static PKI key pair and one ephemeral PKI key pair is more subject to risks of attacks from specifically chosen ephemeral PKI keys, such as ephemeral public keys that are either (i) not on the curve or (ii) specifically selected to expose information about the static private key. Thus, (a) repeated use of ECDHE key exchanges over time with different ephemeral PKI keys, compared to (b) using an ECDH key exchange with one static PKI key pair will result in greater security regarding confidentiality of communications. A need exists in the art where the greater security of ECDHE key exchanges can be obtained while also using static ECC PKI keys recorded by at least one of the nodes deriving a symmetric ciphering key using the ECDHE key exchange.

Many applications or new standards such as TLS version 1.3, DPP version 1.0 and 5G network standards from the 3$^{rd}$ Generation Partnership Project (3GPP) implement ECDHE key exchanges in order to quickly establish confidentiality early in the communications between two nodes. As noted above, a traditional ECDHE key exchange establishes confidentiality without authentication, and authentication must be obtained through other means, such as ECDSA or DSA with certificate verification, message digest, etc. However, the nodes participating in communications with the above standards typically have access to other, secure and previously recorded PKI keys besides the ephemeral PKI keys derived in order to conduct the ECDHE key exchange. A need exists in the art for a node to use the previously recorded PKI keys for (a) a new ECDHE key exchange in order to establish an authenticated key exchange without (b) the risks of ECDH key exchanges for static PKI keys as discussed above.

In addition, a device seeking to establish secured communication with a server may not be able to efficiently or securely verify a full certificate chain for a certificate from a server or a network, due to limitations such as lack of Internet connectivity for the device, lack of global date and time to properly check certificate revocation, incompatible parameters for verifying signatures from intermediate certificate authorities, etc. A need exists in the art for a device to use a previously recorded public key for a server or a network in order to include the public key in an authenticated ECDHE key exchange such that communications with a server can be secured without a separate requirement for full certificate verification through all intermediate root certificates to a root certificate stored in the device.

Solutions have been proposed in the art for an authenticated Diffie-Hellman or elliptic curve Diffie-Hellman key exchange using ephemeral keys and static keys. Blake-Wilson et al in the paper "Key Agreement Protocols and their Security Analysis", which is herein incorporated by reference, propose the use of both long-term static keys and short-term ephemeral keys with a DH key exchange in order to conduct the key exchange in an authenticated manner in order to address some needs in the art mentioned above. Likewise, the Internet Engineering Task Force (IETF) proposes the use of elliptic curve ephemeral and static PKI keys in the "Request for Comments" (RFC) 5753 document "Use of Elliptic Curve Cryptography (ECC) Algorithms in Cryptographic Message Syntax (CMS)", which is also hereby incorporated by reference.

However, the methods described for Blake-Wilson, RFC 5753, and related systems depend on (a) the recipient/responder of an ephemeral ECC public key from a sender/initiator to (b) also to record or operate with the static private ECC key corresponding to the static public key recorded by the sender. This can reduce scalability of a system with (i) a plurality of senders/initiators and (ii) a plurality of recipients/responders receiving an ephemeral ECC public keys for ECDHE key exchanges, since each recipient/responder also needs to record and operate on the static ECC private key corresponding to the static ECC public key recorded by the sender/initiator. The overall security of a system can be decreased for a system of potentially millions of devices and several servers, where the servers need to record server static private ECC keys corresponding to server static public ECC keys recorded by devices. A need exists in the art for (a) a recipient/responder to support authenticated ephemeral ECDH key exchanges without (b) the recipient/responder also recording the static ECC private key corresponding to the static ECC public key recorded by the sender/initiator.

Many other examples exist as well for needs in the art to conduct an ECDHE key exchange in a secure manner where at least one of the nodes can be authenticated, and the above are examples are just a few and intended to be illustrative instead of limiting.

SUMMARY

Methods and systems are provided for a server to conduct an ephemeral elliptic curve Diffie-Hellman key exchange (ECDHE) with a device and a key server. The device and the server can record and operate a set of compatible values and algorithms for a key pair generation algorithm, an ECDH key exchange algorithm, a key derivation function, a symmetric ciphering algorithm, and a random number generator, and a set of cryptographic parameters. The device can comprise a computing device with a network interface to communicate with the server via an IP network. The device can comprise a transducer device for operating a transducer and communicating the transducer data with the server via secured communications. The device can comprise a device for "the Internet of Things", a mobile phone, a tracking device, a security system, a module, or similar devices. The server can comprise a computing device with a network interface to communicate with the device via the IP network and the key server via a private network. The device can record a network static public key and a domain name service (DNS) name or uniform resource locator (URL) for the server. The key server can record the network static private key. The server can record and operate a server database. The device can be one of a plurality of different devices communicating with the server.

Before distribution to an end user of the computing device, a device manufacturer or a device distributor or a device owner could record a set of data in nonvolatile memory for the device. In addition to regular operating data and programs for the device, such as an operating system and a transducer driver, the data recorded in device before distribution could include (i) a network static public key, (ii) a set of cryptographic parameters associated with the network static public key, and (iii) a device identity for the computing device. For a first exemplary embodiment, the network static public key can be unique for the device and not shared with other devices. For a second exemplary embodiment, the network static public key can be shared across a set of devices and thus the network static public key would not be uniquely recorded in an individual device, but the network static public key could be uniquely recorded in a set of devices.

After power up and/or connecting with the IP network, the device can use the random number generator, the cryptographic parameters, and the key pair generation algorithm to derive a device ephemeral private key and a device ephemeral public key. The device can send the device ephemeral public key and the associated set of cryptographic parameters to the server in a first message using the DNS name or a URL for the server. The device can also optionally send a device identity or a secure hash value for the network static public key to the server, in order for the server to identify the device or set of devices. In some exemplary embodiments, the identity of the device and also the secure hash value can be omitted from the first message and the server identifies the group of devices by a particular IP address and port number and/or URL and/or DNS name used by the server and receiving data from devices. In other words, without identifying data, (x) a subset of devices sending data (i) to the server where (ii) the server uses a particular name, URL, or IP address and/or port number can be identified by (Y) the server receiving data from the devices using the IP address and port number and/or URL and/or DNS name.

The server can receive the first message and process the first. The server can use the received set of cryptographic parameters to conduct an ECC point validation step to verify that the received ECC public key comprises a point on a named curve specified by the set of cryptographic parameters. The server can record the name or URL for a key server and communicate with the key server through a private network or a secured session over a public network such as the Internet. The server can establish a secure session with the key server. The server can (a) select the key server for the device using identifying information from the first message and then (b) forward the device ephemeral public key in a second message to the key server after the validation step. The second message can also include the set of cryptographic parameters. The identifying information from the first message for the device could comprise any of (i) an optional identity of the device in the first message, (ii) an optional secure hash value for the network static public key in the first message, (iii) the use of a particular set of cryptographic parameters in the first message, where the set of cryptographic parameters are associated with a particular key server, or (iv) the server can operate such that the use of a particular URL or IP address and port number is mapped to a particular key server.

The server can use a random number generator and a key pair generation algorithm and the set of cryptographic parameters to derive a random number for a server ephemeral private key and then use the server ephemeral private key to generate a server ephemeral public key. The server can conduct a first elliptic curve Diffie-Hellman key exchange (ECDH) using (i) the derived server ephemeral private key and received device ephemeral public key and (ii) the set of cryptographic parameters in order to derive a first shared secret. The server can also operate and record a key derivation function and a symmetric ciphering algorithm. The server can operate or be associated with a server database in order to record data for the server communicating with a plurality of different devices, such that different keys for different devices could be tracked by the server. In exemplary embodiments the first message is received with a random number generated by the device and also a source IP address and port number, and the server records the random number and the source IP address and port number for the first message in the server database.

The key server can receive the second message from the server over the secure connection. The second message can include the device ephemeral public key and the set of cryptographic parameters. For embodiments where the first message includes identifying information for the device (e.g. any of (i) through (iv) in the above paragraph), then the second message to the key server can also include the identifying information for the device. The key server can select or read the network static private key using the second message received from the server (including possibly identifying information of the device such as, but not limited to, a secure hash value for the network static public key, to select a specific network static private key for the device). The key server can conduct a second ECDH key exchange using (i) the selected network static private key for the device and the received device ephemeral public key and (ii) the set of cryptographic parameters in order to derive a second shared secret. The key server can send a response to the second message in the form of a third message to the server, where the third message includes the derived second shared secret.

The server can receive the derived second shared secret from the key server in the third message. The third message can also include identifying information such that the server can track which of the devices the third message from the key server is associated with. The server can conduct an ECC point verification step to verify that the received point from the key server comprising the second shared secret is a point on the ECC curve specified by the set of cryptographic parameters received in the first message. The server can conduct an ECC point addition operation using (i) the derived first shared secret by the server and (ii) the received second shared secret from the key server. The resulting value from the ECC point addition operation can comprise a third shared secret. The server can input the third shared secret into a key derivation function in order to derive a symmetric ciphering key. The server can encrypt a random number generated by the server and a certificate for the server using the derived symmetric ciphering key and the symmetric ciphering algorithm. The server can generate a digital signature for a fourth message with the certificate and the random number using the private key corresponding to the public key in the certificate. The data encrypted by the server, including the digital signature, can comprise a first ciphertext. The server can send the device the fourth message, where the fourth message includes the server ephemeral public key and the first ciphertext.

The device can receive the fourth message from the server and take steps to process the message. The device can conduct a third ECDH key exchange with the received server ephemeral public key. The device, using the set of cryptographic parameters, can perform an elliptic curve point addition operation on (i) the received server ephemeral public key from the fourth message and (ii) the recorded network static public key. The device can input (x) the point derived from the ECC point addition and (y) the device ephemeral private key into an ECDH key exchange algorithm in order to mutually derive the third shared secret with the server. Device can input the third shared secret into a key derivation function in order to derive the same symmetric ciphering key derived and used by the server. The device can decrypt the first ciphertext using the derived symmetric ciphering key. The device can read the plaintext from the first ciphertext. The device can take additional steps to communicate with the server, such as (i) verifying a signature in a certificate within the first ciphertext. (ii) using the public key from the certificate to verify a server digital signature for the fourth message. (iii) recording and using a public key for the server from the certificate in the first ciphertext, and other possibilities exist as well. The device can then use the derived symmetric ciphering key to encrypt a second ciphertext for the server and send the second ciphertext to the server in a fifth message. In exemplary embodiments, the derived symmetric ciphering key can comprise a first portion for encrypting and decrypting data sent from the server to the device and a second, different portion for encrypting and decrypting data sent from the device and to the server. The server can receive the fifth message and decrypt the second ciphertext using the same symmetric ciphering key derived by the server.

The systems and methods described above can also be used with particular implementations for a computing device and a server. A 5$^{th}$ generation or 6$^{th}$ generation wireless WAN network such as from 3GPP could utilize the steps above in order to conduct an ECDHE key exchange with a server authentication and a key server. For this embodiment, the computing device could comprise a wireless device or wireless terminal, including a mobile phone or smart phone. The server could comprise a "g Node B" for "next generation node b", which provides equivalent functionality of a base transceiver station and manages the radio-frequency communications with the wireless device. The key server could comprise a secured server operating within the authentication function of a wireless network or associated with the authentication function of a wireless network for a mobile network operator. For the embodiment in this paragraph, the cryptographic parameters could comprise the values for curve 25519, although other ECC curves could be utilized as well.

The systems and methods described above can also be used with a device provisioning protocol. The computing device as described above can comprise an initiator according to the Device Provisioning Protocol specification version 1.0 from the WiFi Alliance®. The server can comprise a responder according to the same specification. Subsequent versions of the specification can utilize the methods and systems described herein as well. The device can receive and record the network static public key in the form of a responder bootstrap public key. A key server could record the network static private key in the form of a responder bootstrap private key. The responder/server can receive the first message with (a) the device ephemeral public key from the initiator/device along with (b) a secure hash value of the responder bootstrap public key, and (c) an initial ciphertext. The responder/server can use the secure hash value of the responder bootstrap public key to select the key server for the device. The responder/server can forward the device ephemeral public key to the selected key server. The key server can conduct the second ECDH key exchange with the device ephemeral public key and the responder bootstrap private key and send the second shared secret to the responder/server. The server can use the second shared secret to decrypt the initial ciphertext received with the first message.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, wherein like numerals denote like entities.

FIG. 2d is an illustration of an exemplary server database and an exemplary set of cryptographic parameters, in accordance with exemplary embodiments;

DETAILED DESCRIPTION

FIG. 1a

Figure 1A:
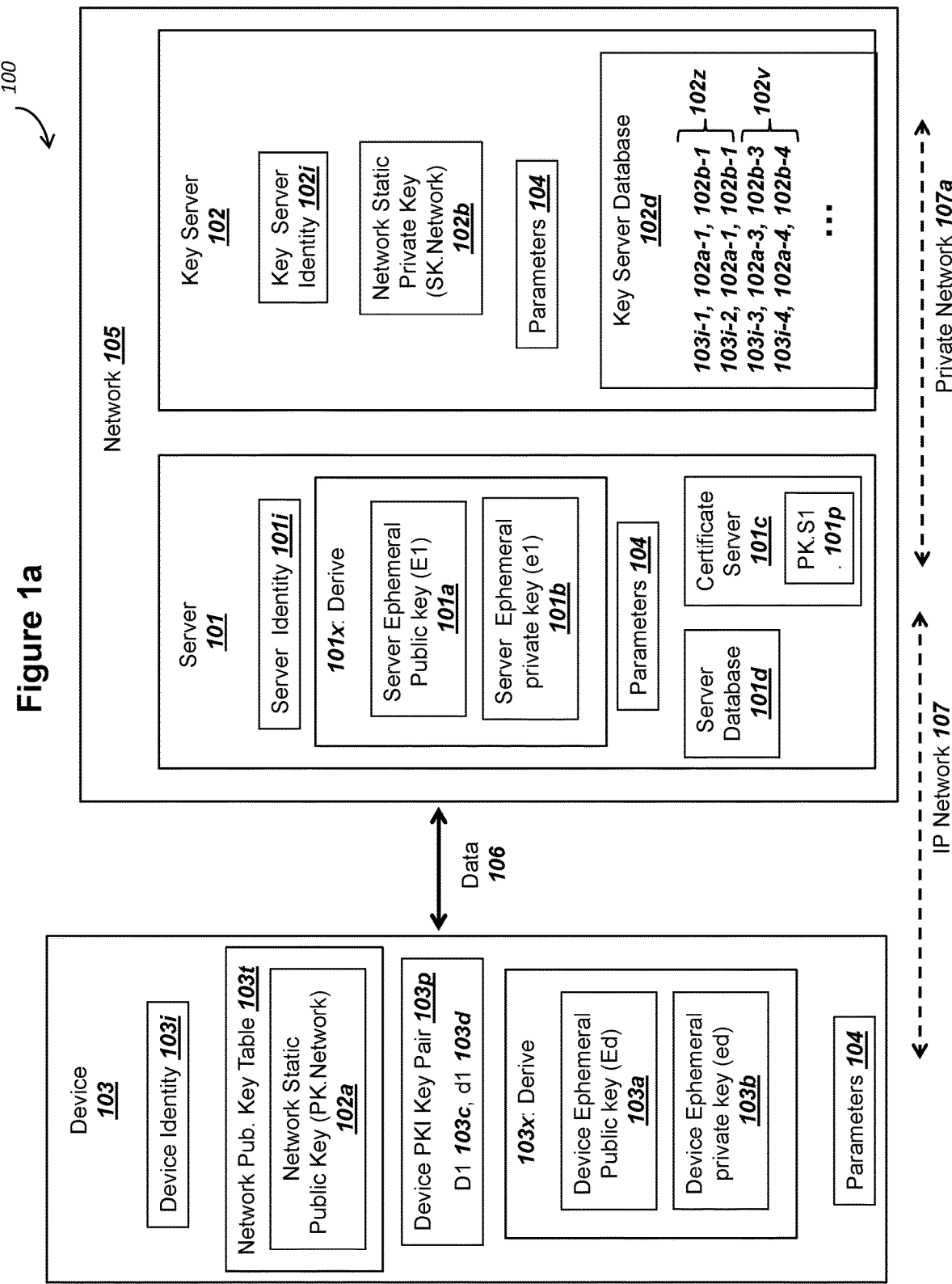
FIG. 1a is a graphical illustration of an exemplary system, where device communicates data with a network in order to conduct a key exchange, in accordance with exemplary embodiments.

FIG. 1a is a graphical illustration of an exemplary system, where device communicates data with a network in order to conduct a key exchange, in accordance with exemplary embodiments. The system 100 can include a device 103 and a network 105, where the nodes can communicate data 106 over an Internet Protocol (IP) network 107. Network 105 can comprise a plurality of servers supporting communication such as data 106 with a plurality of devices 103. In exemplary embodiments, network 105 can include a server 101 and a key server 102. The exemplary servers shown for network 105 in system 100 can be either different physical computers such as rack-mounted servers, or different logical or virtual servers or instances operating in a "cloud" configuration. Or, server 101 and key server 102 could represent different logical "server-side" processes within a network 105, including different programs running on a server that listen and communicate using different IP port numbers within one physical server. In exemplary embodiments, server 101 and key server 102 can operate using the physical electrical components depicted and described for a server 101 in FIG. 1b below. Other possibilities exist as well for the physical embodiment of server 101 and key server 102 without departing from the scope of the present disclosure. In exemplary embodiments, server 101 can be described as a "first server" and key server 102 can be described as a "second server". Further, the combination of a first server 101 and a second server 102 can comprise a network 105. The combination of a first server 101 and a second server 102 can also comprise a "set of servers".

Although server 101 and key server 102 are depicted in FIG. 1a as belonging to the same network 105, server 101 and key server 102 could be associated with different networks and communicate in a secure manner. Secure sessions between server 101 and key server 102 could be established over IP network 107 using methods including a physical wired connection via a local area network (LAN), transport layer security (TLS), a virtual private network (VPN), and IP Security (IPSEC), and other possibilities exist as well. As depicted in FIG. 1a, server 101 and key server 102 could communicate over a private network 107a.

Device 103 can be a computing device for sending and receiving data. Device 103 can take several different embodiments, such as a general purpose personal computer, a mobile phone based on the Android R from Google 'R' or the IOS operating system from Apple 'R', a tablet, a networked device with a sensor or actuator for the "Internet of Things", a module for "machine to machine" communications, a device that connects to a wireless or wired Local Area Network (LAN), an initiator according to the Device Provisioning Protocol specification (DPP) from the WiFi alliance, a router, and/or a server, and other possibilities exist as well without departing from the scope of the present disclosure. Exemplary electrical components within a device 103 can be similar to the electrical components for a server 101 depicted and described in FIG. 1b below, where device 103 can use electrical components with smaller capacities and lower overall power consumption, compared to the capacity and power consumption for the same electrical components in a server 101.

Device 103 can include a device identity 103i, which could comprise a string or number to uniquely identify device 103 with network 105 and/or server 101 and server 102. Device identity 103i could comprise a medium access control (MAC) address for a physical interface such as Ethernet or WiFi, a Subscription Permanent Identifier (SUPI) with 5G networks, an international mobile subscriber identity (IMSI) or international mobile equipment identity (IMEI) with 2G/3G/4G networks, and other possibilities exist as well without departing from the scope of the present disclosure. In exemplary embodiments, device identity 103i can be written to hardware in device 103 and operate as a unique, long-term identity for device 103.

Device 103 can record at least one elliptic curve cryptography (ECC) static public key for network 105 comprising network static public key PK.network 102a. Network static public key 102a could be recorded in nonvolatile or volatile memory within device 103. For embodiments where key 102a is recorded in nonvolatile memory, key 102a could be recorded by a device manufacturer or device distributor. For embodiments where key 102a is recorded in volatile memory, device 103 could obtain key 102a from a different server than server 101 for network 105 before sending data 106, such as device 103 obtaining key 102a via a secure session from a different server before sending data 106. A device 103 can record a plurality of different network static public keys 102a in a network public key table 103t. Different keys 102a in a table 103t could be associated with different networks 105 or different servers 101 that device 103 communicates with over time. Exemplary data for a network public key table 103t for device 103 is depicted and described in connection with FIG. 1c below. The different keys 102a can be associated with network names and/or Uniform Resource Locators (URLs) or domain names, such that device 103 can select the network static public key 102a based on a URL or domain name for a network 105 or a server 101 where device 103 will send data 106.

Network static public key PK.network 102a can be obtained by device 103 before conducting an elliptic curve Diffie-Hellman (ECDH) key exchange or an ephemeral elliptic curve Diffie-Hellman (ECHDE) key exchange. Network static public key 102a could be obtained by device 103 in several different ways. Network static public key 102a could be written into memory by a manufacturer, distributor, or owner of device 103 before device 103 connects with server 101 or a network 105. Network static public key 102a could be received by device 103 over an IP network 107 via a secured session, such as a TLS, DTLS, IPSec, or VPN connection before sending data 106 to server 101. In exemplary embodiments, network static public key 102a is recorded in device 103 in a secured and authenticated manner, such that device 103 can trust network static public key 102a.

As one exemplary embodiment, network static public key 102a could be a public key within a certificate, where the public key 102a is signed by a certificate authority. Although not depicted in FIG. 1a, device 103 could also record a certificate authority root certificate, and device 103 could (a) verify the signature of a certificate authority in a certificate for the public key 102a using (b) the recoded root certificate for the certificate authority (and any intermediary parent certificates). Network static public key 102a could be processed or formatted according to a set of parameters 104, and network static public key 102a could also be compatible with parameters 104. Although public key 102a is described as "static", the key could change over time such as with the expiration of a validity date when recorded in a certificate. Public key 102a could remain static over the period of time for device 103 to conduct at least one ECDHE key exchange, where the ECDHE key exchange uses ephemeral or derived ECC PKI keys. Public key 102a could comprise a long-term public key for use by device 103 when communicating with network 105. Although the use of a certificate for public key 102a is described in this paragraph for public key 102a, the use of a certificate is not required. In an embodiment depicted in FIG. 3c below, (i) public key 102a could comprise a responder bootstrap public key and (ii) device 103 could comprise an initiator according to the DPP standard, which is also depicted and described in connection with FIG. 3c below.

Cryptographic parameters 104 can specify values or settings for (i) conducting an ECDH or ECDHE key exchange, (ii) mutually deriving a symmetric ciphering key, and (iii) using a symmetric ciphering algorithm. As contemplated herein, cryptographic parameters 104 may also be referred to as parameters 104. Each of device 103, server 101, and key server 102 can record at least one compatible subset of parameters within a set of cryptographic parameters 104. Parameters 104 can specify values for an elliptic curve cryptography (ECC) curve name, key length, key formatting (e.g. compressed or uncompressed), encoding rules, etc. As contemplated herein, the parameters 104 and cryptographic algorithms used with ECC PKI keys and a key exchange in the present disclosure can be compatible and substantially conform with ECC algorithms and keys as specified in (i) the IETF Request for Comments (RFC) 6090 titled "Fundamental Elliptic Curve Cryptography Algorithms", and (ii) IETF RFC 5915 titled "Elliptic Curve Private Key Structure", and also subsequent and related versions of these standards. For use of ECC algorithms, parameters 104 can specify elliptic curve names such as, but not limited to NIST P-256, sect283k1, sect283r1, sect409k1, sect409r1, and other possibilities exist as well. Further, elliptic curves that do not depend on curves currently specified by the National Institute of Standards and Technology (NIST) could be utilized as well, such as, but not limited to. Curve22519, curve448, or FourQ. Parameters 104 can specify domain parameters for nodes in system 100 to calculate values or numbers in a compatible manner, such as common base point G for use with ECC PKI key pairs and a defining equation for an elliptic curve. Other values within sets of cryptographic parameters 104 are possible as well, without departing from the scope of the present disclosure. An exemplary set of cryptographic parameters 104 is depicted and described in connection with FIG. 2e below, and PKI keys used by device 103, server 101, and key server 102 could be associated with a member of the set of cryptographic parameters, such as a single row in the parameters 104 depicted in FIG. 2e below.

Device 103 can include an ECC key pair generation algorithm 103x and server 101 can include a compatible ECC key pair generation algorithm 101x. A key pair generation algorithm 103x or 101x can use (i) a random number generator in order to derive the ephemeral PKI private key and (ii) a selected set of cryptographic parameters 104 in order to calculate the ephemeral PKI public key. In exemplary embodiments, a random number for the ephemeral PKI private key multiplies the base point G from the parameters 104 in order to obtain the corresponding ephemeral PKI public key. Other possibilities exist as well for the algorithms 103x and 101x to derive an ephemeral ECC PKI key pair without departing from the scope of the present disclosure. A key pair generation algorithm 103x for device 103 can output an ephemeral ECC PKI pair comprising device ephemeral public key Ed 103a and device ephemeral private key ed 103b. A key pair generation algorithm 101x for server 101 can output an ephemeral ECC PKI pair comprising server ephemeral public key E1 101a and server ephemeral private key e1 101b. As contemplated in the present disclosure, the use of a capital letter as the first character for a PKI key can represent a public key, the use of a lower case letter as the first character for a PKI key can represent a private key. As contemplated in the present disclosure, the second letter for a PKI key can represent the entity the key is associated with or belongs to (e.g. "d" for device 103 and "1" for server 101).

Device 103 can also record a device static PKI key pair 103p in nonvolatile memory or within a secure processing environment within device 103. The key pair 103p can be either (i) generated by device 103 during device manufacturing or device distribution, or (ii) generated externally from device 103 and written to device 103 in a secure manner during device manufacturing or device distribution. The PKI key pair 103p can comprise a device static private key d1 103d and a device static public key D1 103c. The keys d1 103d and D1 103c could be formatted and compatible with the set of cryptographic parameters 104. In exemplary embodiments, public key D1 103c can be recorded in an X.509 certificate from a certificate authority.

As depicted in FIG. 1a, server 101 can include a server identity 101i, a key pair generation algorithm 101x, a set of cryptographic parameters 104, a server database 101d, and a server certificate 101c. Server identity 101i can comprise a name or number to uniquely identify server 101 in network 105 and/or IP network 107. In exemplary embodiments, server identity 101i can comprise a domain name service (DNS) name, which could comprise a string of characters and/or numbers. Server identity 101i could be associated with an IP address, such that the exemplary data 106 from device 103 could be routed to server 101 via the IP network 107. Server identity 101i could also comprise a MAC address, and a server identity 101i could comprise multiple different values such as all of a MAC address, a DNS name, and virtual instance identity if server 101 operates as a virtual server. In summary, server identity 101i can allow (a) a plurality of different devices 103 to (b) select and route data 106 to server 101 from a potential plurality of different servers and nodes. Server identity 101i could also comprise a server name indication (SNI) value. Other possibilities exist as well for the format, structure, or value for a server identity 101i without departing from the scope of the present disclosure.

A key pair generation algorithm 101x for server 101 was described above in connection with key pair generation algorithm 103x for device 103. Key pair generation algorithm 101x can derive ephemeral ECC PKI keys for server 101 to use with ECDHE key exchanges for a plurality of different devices 103. Note that although a single ECC PKI key pair of public key E1 101a and private key e1 101b is depicted for system 100, server 101 could derive and operate with a plurality of different keys E1 101a and e1 101b with different devices 103. The plurality of different keys E1 101a and e1 101b for communicating with different devices 103 could be recorded in a server database 101d as depicted and described in connection with FIG. 2d below. The set of cryptographic parameters 104 for server 101 can be equivalent to or a superset of the cryptographic parameters 104 used by device 103. The description above for a set of parameters 104 used by a device 103 is also applicable to a set of parameters 104 used by a server 101.

Server database 101d for server 101 can comprise a database or memory recording data for server 101 to communicate with both a plurality of devices 103 and also at least one key server 102. An exemplary server database 101d is depicted and described in connection with FIG. 2d below. Server database 101d can record values for PKI keys, derived shared secrets, derived symmetric ciphering keys, random numbers used in secure sessions, and related values in order to support the communications with both device 103 and key server 102. Server certificate 101c can comprise a certificate formatted according to the X.509 family of standards and include a static server 101 public key PK.S1 101p. Server certificate 101c can include a signature from a certificate authority for server public key PK.S1 101p. Although not depicted in FIG. 1a, server 101 can also record and operate with a private key corresponding to public key PK.S1 101p.

As depicted in FIG. 1a, key server 102 can include a key server identity 102i, a set of cryptographic parameters 104, a network static private key SK.network 102b, and a key server database 102d. Key Server identity 102i can comprise a name or number to uniquely identify key server 102 in network 105 and/or IP network 107. Key Server identity 102i can be similar to server identity 101i, except using a different value, name, or number in order to uniquely identify key server 102 within network 105. The set of cryptographic parameters 104 for server 102 can be equivalent to or a superset of the cryptographic parameters 104 used by device 103 and parameters 104 was also described above for device 103.

In exemplary embodiments, the parameters 104 used by both key server 102 and server 101 can be fully compatible, such as using the same ECC named curve, key lengths, encoding rules, etc. Server database 102d for key server 102 can comprise a database or memory recording data for key server 102 to (i) communicate with a plurality of servers 101 and (ii) support server 101 communicating with a plurality of devices 103. Key server database 102d can be similar to server database 101d depicted in FIG. 2d, except that key server database 102d can record values and data calculated by key server 102. Key server database 102d can record values for PKI keys, derived shared secrets, and related values in order to support the communications between (i) network 105 and/or server 101 and (ii) device 103. As depicted in FIG. 1a, key server database 102d can record sets of data for different devices 103, where each set can comprise a row in a table with a device identity 103i, the network static public key value PK.network 102a, and the network static private key SK.network 102b. Although not depicted in FIG. 1a, a key server database 102d could also record or store a secure hash value for the network public key 102a, where the algorithm for the secure hash value could be specified in a member of the set of cryptographic parameters 104. For some exemplary embodiments, (i) a device identity 103i could be omitted from a key server database 102d or (ii) the device identity 103i could comprise a secure hash value over either the network public key 102a or the device static public key 103c.

As depicted for a key server database 102d in FIG. 1a, some devices 103 could share the same keys 102a and 102b, which could comprise shared keys 102z for the devices 103 as depicted and described in connection with FIG. 1c below. Other devices 103 could record unique keys 102v, where devices 103 record a value for the network static public key PK.network 102a that is uniquely recorded in each device. A key server database 102d could record and track the associated network private and public keys for each device. In other exemplary embodiments, a key server 102 could omit recording device identities 103i in a database 102d, and key server 102 could associate and use a network static private key SK.network 102b with a particular server 101 (e.g. all data from a server 101 could use or be associated with the private key SK.network 102b).

Other possibilities exist as well for the mapping of network static private keys to either servers 101 or devices 103 without departing from the scope of the present disclosure. Also, although a single value for SK.network 102b is depicted as associated with a device 103, a key server 102 could also use multiple different values of SK.network 102b, such as (i) different values for SK.network 102b for different parameters 104 (e.g. different named curves), or (ii) separate values for SK.network 102b for digital signatures and ECDH key exchanges. In other words, a device 103 could also record the corresponding different multiple values for PK.network 102a, and select and use the public keys depending on requirements such as parameters 104 used or if the network public key will be used for verifying digital signatures or conducting ECDH key exchanges.

Key server 102 can record at least one network static private key SK.network 102b, which can be the private key corresponding to the network static public key PK.network 102a recorded by device 103 and described above for device 103. In exemplary embodiments and as depicted in FIG. 1a and also FIG. 2a below, key server 102 may not communicate with device 103 directly, but rather communicates with server 101 through a private network 107a. Although not depicted in FIG. 1a, a network 105 could operate a firewall in order to prevent packets or data from the public Internet (other than server 101) from reaching key server 102. In this manner by isolating key server 102 from IP network 107, security for the key server 102 and the network static private key SK.network 102b can be enhanced, since only authenticated and authorized nodes within network 105 and connected to private network 107a could communicate with server 102.

IP network 107 could be either a Local Area Network (LAN) or a Wide Area Network (WAN), or potentially a combination of both. IP network 107 could include data links supporting either IEEE 802.11 (WiFi) standards. Device 103 also utilize a variety of WAN wireless technologies to communicate data 106 with server 101, including Low Power Wide Area (LPWA) technology, 3rd Generation Partnership Project (3GPP) technology such as, but not limited to, 3G, 4G Long-Term Evolution (LTE), or 4G LTE Advanced, NarrowBand—Internet of Things (NB-IoT), LTE Cat M, proposed 5G networks, and other examples exist as well. Server 101 can connect to the IP network 107 via a wired connection such as, but not limited to, an Ethernet, a fiber optic, or a Universal Serial Bus (USB) connection (not shown). IP network 107 could also be a public or private network supporting Internet Engineering Task Force (IETF) standards such as, but not limited to, such as, RFC 786 (User Datagram Protocol), RFC 793 (Transmission Control Protocol), and related protocols including IPV6 or IPv4. A public IP network 107 could utilize globally routable IP addresses. Private IP network 107a could utilize private IP addresses which could also be referred to as an Intranet. Other possibilities for IP Network 107 and Private Network 107a exist as well without departing from the scope of the disclosure.

FIG. 1b

Figure 1B:
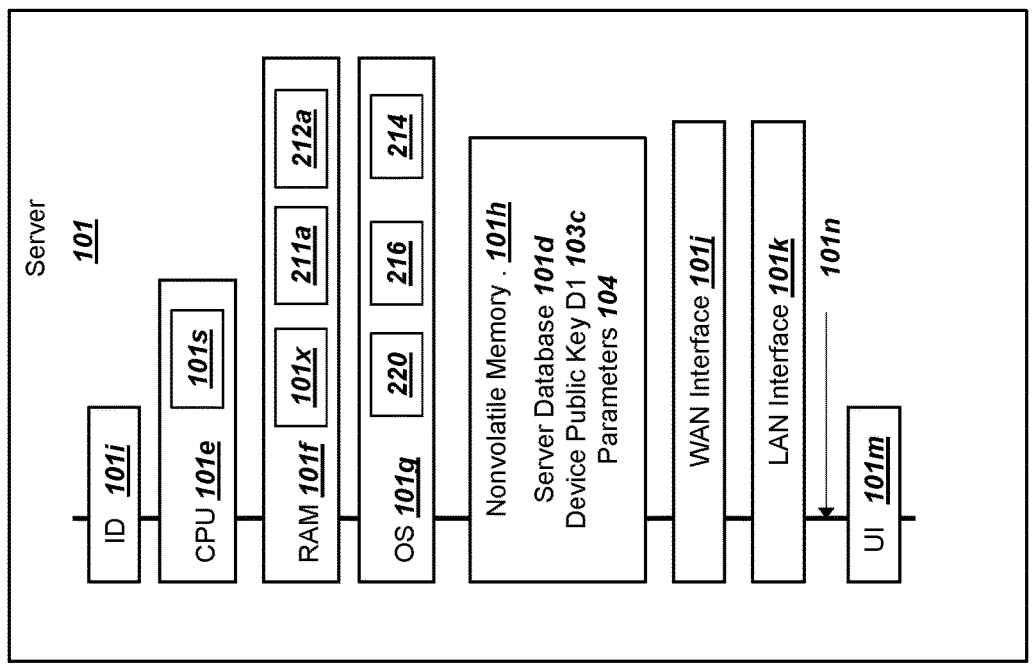
FIG. 1b is a graphical illustration of hardware, firmware, and software components for a server, in accordance with exemplary embodiments.

FIG. 1b is a graphical illustration of hardware, firmware, and software components for a server, in accordance with exemplary embodiments. FIG. 1b is illustrated to include several components that can be common within a server 101. Server 101 may consist of multiple electrical components in order to communicate with a plurality of devices 101 and a key server 102. In exemplary embodiments and as depicted in FIG. 1b, server 101 can include a server identity 101i, a processor 101e (depicted as "CPU 101e"), random access memory (RAM) 101f, an operating system (OS) 101g, storage memory 101h (depicted as "nonvolatile memory 101h"), a Wide Area Network (WAN) interface 101j, a LAN interface 101k, a system bus 101n, and a user interface (UI) 101m.

Server identity 101i could comprise a preferably unique alpha-numeric or hexadecimal identifier for server 101, such as an Ethernet MAC address, a domain name service (DNS) name, a Uniform Resource Locator (URL), an owner interface identifier in an IPV6 network, a serial number, an IP address, or other sequence of digits to uniquely identify each of the many different possible nodes for a server 101 connected to an IP network 105. Server identity 101i could comprise a server name indicator (SNI). Server identity 101i can preferably be recorded in a non-volatile memory and recorded by a network 105 upon configuration of a server 101. Server identity 101i may also be a number or string to identify an instance of server 101 running in a cloud or virtual networking environment. In exemplary embodiments, server 101 can operate with multiple different server identities 101i, such as a first server identity 101i comprising a DNS name and a second server identity 101i comprising an IP address and a port number. A different server 101 could be associated with a different IP address and port number for a network 105.

The CPU 101e can comprise a general purpose processor appropriate for higher processing power requirements for a server 101, and may operate with multiple different processor cores. CPU 101e can comprise a processor for server 101 such as an ARMR: based process or an Intel® based processor such as belonging to the XEON R: family of processors, and other possibilities exist as well. CPU 101e can utilize bus 101n to fetch instructions from RAM 101f and operate on the instruction. CPU 101e can include components such as registers, accumulators, and logic elements to add, subtract, multiply, and divide numerical values and store or record the results in RAM 101 for storage memory 101h, and also write the values to an external interface such as WAN interface 101*j* and/or LAN interface 101*k*. In exemplary embodiments. CPU 101*e* can perform the mathematical calculations for a key pair generation step 101*x* and also an ECDH key exchange algorithm 220 depicted in FIG. 2*a*. FIG. 2*b*, etc., below.

CPU 101*e* can also contain a secure processing environment (SPE) 101*s* in order to conduct elliptic curve cryptography (ECC) operations and algorithms, such as an ECC point addition step 214 depicted in FIG. 2*c* below, as well as deriving ephemeral ECC PKI keys such as with key generation step 101*x* depicted and described in connection with FIG. 1*a* above. SPE 101*s* can comprise a dedicated area of silicon or transistors within CPU 101*e* in order to isolate the ECC operations from other programs or software operated by CPU 101*e*, including many processes or programs running operating system 101*g*. SPE 101*s* could contain RAM memory equivalent to RAM 101*f* and nonvolatile memory equivalent to storage memory 101*h*, as well as a separately functioning processor on a smaller scale than CPU 101*e*, such as possibly a dedicated processor core within CPU 101*e*. SPE 101*s* can comprise a "secure enclave" or a "secure environment", based on the manufacturer of CPU 101*e*. In some exemplary embodiments, an SPE 101*s* can be omitted and the CPU 101*e* can conduct ECC operations or calculations without an SPE 101*s*.

RAM 101*f* may comprise a random access memory for server 101. RAM 101*f* can be a volatile memory providing rapid read/write memory access to CPU 101*e*. RAM 101*f* could be located on a separate integrated circuit in server 101 or located within CPU 101*e*. The RAM 101*f* can include data recorded in server 101 for the operation when communicating with a plurality of devices 103 or a key server 102. The system bus 101*n* may be any of several types of bus structures including a memory bus or memory controller, a peripheral bus, and a local bus using any of a variety of bus architectures including a data bus. System bus 101*n* connects components within server 101 as illustrated in FIG. 1*b*, such as transferring electrical signals between the components illustrated. Server 101 can include multiple different versions of bus 101*n* to connect different components, including a first system bus 101*n* between CPU 101*e* and RAM 101*f* (which could be a memory bus), and a second system bus 101*n* between CPU 101*e* and WAN interface 101*j* or LAN interface 101*k*, which could be an I2C bus, an SPI bus, a PCI bus, or similar data busses.

In exemplar embodiments. RAM 101*f* operating with server 101 can record values and algorithmic steps or computer instructions for conducting an ECDH key exchange, including a key pair generation step 101*x*, a secret X1 211*a* (depicted in FIG. 2*b* below) and also a secret X2 212*a* (depicted in FIG. 2*b* below). The depicted values and algorithms can be recorded in RAM 101*f* so that CPU 101*e* can conduct ECC operations and calculations quickly using the values. The depicted values could also be recorded in other locations for longer-term or nonvolatile storage, such as within a server database 101*d*. Additional or other values besides the ones depicted in FIG. 1*b* can also be recorded in RAM 101*f* in order to support server 101 conducting the communications, steps, and message flows depicted in FIG. 2*a* below and other Figures herein.

The operating system (OS) 101*g* can include Internet protocol stacks such as a User Datagram Protocol (UDP) stack. Transmission Control Protocol (TCP) stack, a domain name system (DNS) stack, a TLS stack, a DPP stack, etc. The operating system 101*g* may include timers and schedulers for managing the access of software to hardware resources within server 101, where the hardware resources managed by OS 101*g* can include CPU 101*e*, RAM 101*f*, nonvolatile memory 101*h*, and system bus 101*n*, and well as connections to the IP network 107 via a WAN interface 101*j*, The operating system shown of 101*g* can be appropriate for a higher power computing device with more memory and CPU resources (compared to a device 103). Example operating systems 101*g* for a server 101 includes Linux or Windows® Server, and other possibilities exist as well. Although depicted as a separate element within server 101 in FIG. 1*b*, OS 101*g* may reside in RAM 101*f* and/or nonvolatile memory 101*h* during operation of server 101.

As depicted in FIG. 1*b*, OS 101*g* in FIG. 1*b* can contain algorithms, programs, or computer executable instructions (by processor 101*e* or SPE 101*s*) for an ECDH key exchange algorithm 220 (depicted and described in FIG. 2*b* and FIG. 2*e* below), a key derivation function (KDF) 216 (depicted and described in FIG. 2*b* and FIG. 2*e* below), and also an ECC point addition operation 214 (depicted and described in FIG. 2*b* and FIG. 2*e* below). The algorithms could be included either (i) within the kernel of OS 101*g*, or (ii) as a separate program or process loaded by OS 101*g* and operated by OS 101*g*, OS 101*g* can also read and write data to a secure processing environment SPE 101*s*, if CPU 101*e* contains SPE 101*s*.

Nonvolatile memory 101*h* or "storage memory" 101*h* (which can also be referred to herein as "memory 101*h*") within server 101 can comprise a non-volatile memory for long-term storage of data, including times when server 101 may be powered off. Memory 101*h* may be a NAND flash memory or a NOR flash memory and record firmware for server 101, such as a bootloader program and OS 101*g*, Memory 101*h* can record long-term and non-volatile storage of data or files for server 101. In an exemplary embodiment. OS 101*g* is recorded in memory 101*h* when server 101 is powered off, and portions of memory 101*h* are moved by CPU 101*e* into RAM 101*f* when server 101 powers on. Memory 101*h* (i) can be integrated with CPU 101*e* into a single integrated circuit (potentially as a "system on a chip"), or (ii) operate as a separate integrated circuit or a removable card or "disk", such as a solid state drive (SSD). Storage memory 101*h* can also comprise a plurality of spinning hard disk drives in a redundant array of independent disks (RAID) configuration. Memory 101*h* may also be referred to as "server storage" and can include exemplary file systems of FAT16, FAT 32, NTFS, ext3, ext4, UDF, or similar file systems. As contemplated herein, the terms "memory 101*h*". "storage memory 101*h*", and "nonvolatile memory 101*h*" can be considered equivalent.

As depicted in FIG. 1*b*, non-volatile memory 101*h* can record a server database 101*d*, a device static public key D1 103*c*, and cryptographic parameters 104. Exemplary data within a server database 101*d* is depicted and described in connection with FIG. 2*d* below. Although depicted in FIG. 1*b* as recorded within memory 101*h*, a server database 101*d* could also operate as a separate server than server 101 in a network 105, and server 101 could query the server database 101*d* using a private network 107*a*. The device static public key D1 101*c* could be received by server 101 from a device manufacturer or a device owner, or directly from device 103 through IP network 107. In addition, as depicted in FIG. 1*b*, memory 101*h* can record the parameters 104 which were depicted and described in connection with FIG. 1*a* above and also FIG. 2*d* below.

Server 101 can include a WAN interface 101*j* to communicate with IP network 107 and a plurality of devices 103, as depicted in FIG. 1*a* above (where FIG. 1*a* depicts a single device 103). WAN interface 101*j* can comprise either a wired connection such as Ethernet or a wireless connection. For wireless configurations of server 101, then WAN interface 101*j* can comprise a radio, which could connect with an antenna in order to transmit and receive radio frequency signals. For a wireless configuration of server 101. WAN interface 101*j* within server 101 can provide connectivity to an IP network 107 through 3GPP standards such as 3G, 4G, 4G LTE, and 5G networks, or subsequent and similar standards. In some exemplary embodiments, server 101 can comprise a "g node b" or gNb in a 5G network (or equivalent functionality in 6G or subsequent networks), and WAN interface 101*j* can comprise a 5G radio access network (RAN) interface. WAN interface 101*j* can also comprise a wired connection such as digital subscriber line (DSL), coaxial cable connection, or fiber optic connection, and other possibilities exist as well without departing from the scope of the present disclosure.

Server 101 may also operate a LAN interface 101*k*, where LAN interface 101*k* can be used to connect and communicate with other servers in a network 107, such as key server 102 through private network 107*a*. LAN interface 101*k* can comprise a physical interface connected to system bus 101*n* for server 101. In exemplary embodiments, LAN interface 101*k* can comprise an Ethernet or fiber optic wired connection. In other words, (i) LAN interface 101*k* can connect server 101 to private network 107*a* (which could comprise an IP network with private IP addresses that are not globally routable), and (ii) WAN interface 101*j* can comprise an interface for communicating with a plurality of devices 103 through insecure networks such as the globally routable public Internet. The use of a separate WAN interface 101*j* and LAN interface 101*k* can increase the security of operation for server 101. However, the use of separate physical interfaces for LAN interface 101*k* and WAN interface 101*j* can be omitted, and a single physical interface such as Ethernet or fiber-optic could be used by server 101 to communicate with both devices 103 and key server 102.

Server 101 may also optionally include user interface 101*m* which may include one or more sub-servers for receiving inputs and/or one or more sub-servers for conveying outputs. User interfaces are known in the art and may be simple for many servers 101 such as a few LED lights or and LCD display, and thus user interfaces are not described in detail here. User interface 101*m* could comprise a touch screen or screen display with keyboard and mouse, if server 101 has sophisticated interaction with a user, such as a network administrator. Server 101 can optionally omit a user interface 101*m*, if no user input or display is required for establishing communications within a network 105 and/or IP network 107. Although not depicted in FIG. 1*b*, server 101 can include other components to support operation, such as a clock, power source or connection, antennas, etc. Other possibilities exist as well for hardware and electrical components operating in a server 101 without departing from the scope of the present disclosure. Using the electrical components depicted in FIG. 1*b*, a server 101 could send and receive the data 106 in FIG. 1*a* in an encrypted and secure manner after conducting the authenticated ECDHE key exchange as contemplated herein, in order to derive a symmetric ciphering key to encrypt and decrypt messages within data 106 with a plurality of devices 103.

Although not depicted in FIG. 1*b*, devices 103 such as the device 103 depicted in FIG. 1*a* above can include (a) equivalent internal electrical components depicted for a server 101 in order to (b) operate as devices 103. A device 103 in FIG. 1*a* could include a processor similar to CPU 101*c*, with primary differences for the processor in a device being reduced speed, a smaller memory cache, a smaller number and size of registers, with an exemplary use of 32 bits for datapath widths, integer sizes, and memory address widths, etc., for a device 103. In contrast, an exemplary 64 bit datapaths could be used for CPU 101*e* in server 101 (although device 103 could also use 64 bit wide datapath widths if device 103 comprises a mobile phone such as a smart phone). For embodiments where device 103 comprises a transducer device for sending and receiving transducer data with a network 105, then a CPU in device 103 could comprise an exemplary 32 bit processor, although other possibilities exist as well.

Similarly, RAM in a device 103 could be a RAM similar to RAM 101*f* in server 101, except the RAM in a device 103 could have fewer memory cells such as supporting exemplary values less than or equal to an exemplary 4 gigabytes, while RAM 103*f* in server 101 could support more memory cells such as greater than or equal to an exemplary 8 gigabytes. In exemplary embodiments, the electrical and physical components of a key server can be equivalent to the electrical components for a server 101 in FIG. 1*b*, with different data recorded in RAM 101*f* for a key server 102, as well as different data recorded in memory 101*h* for a key server 102. For example, a key server 102 could record the network static private key SK.network 102*b* in memory 101*h*, which could include secure disk storage using disk or file encryption.

FIG. 1*c*

Figure 1C:
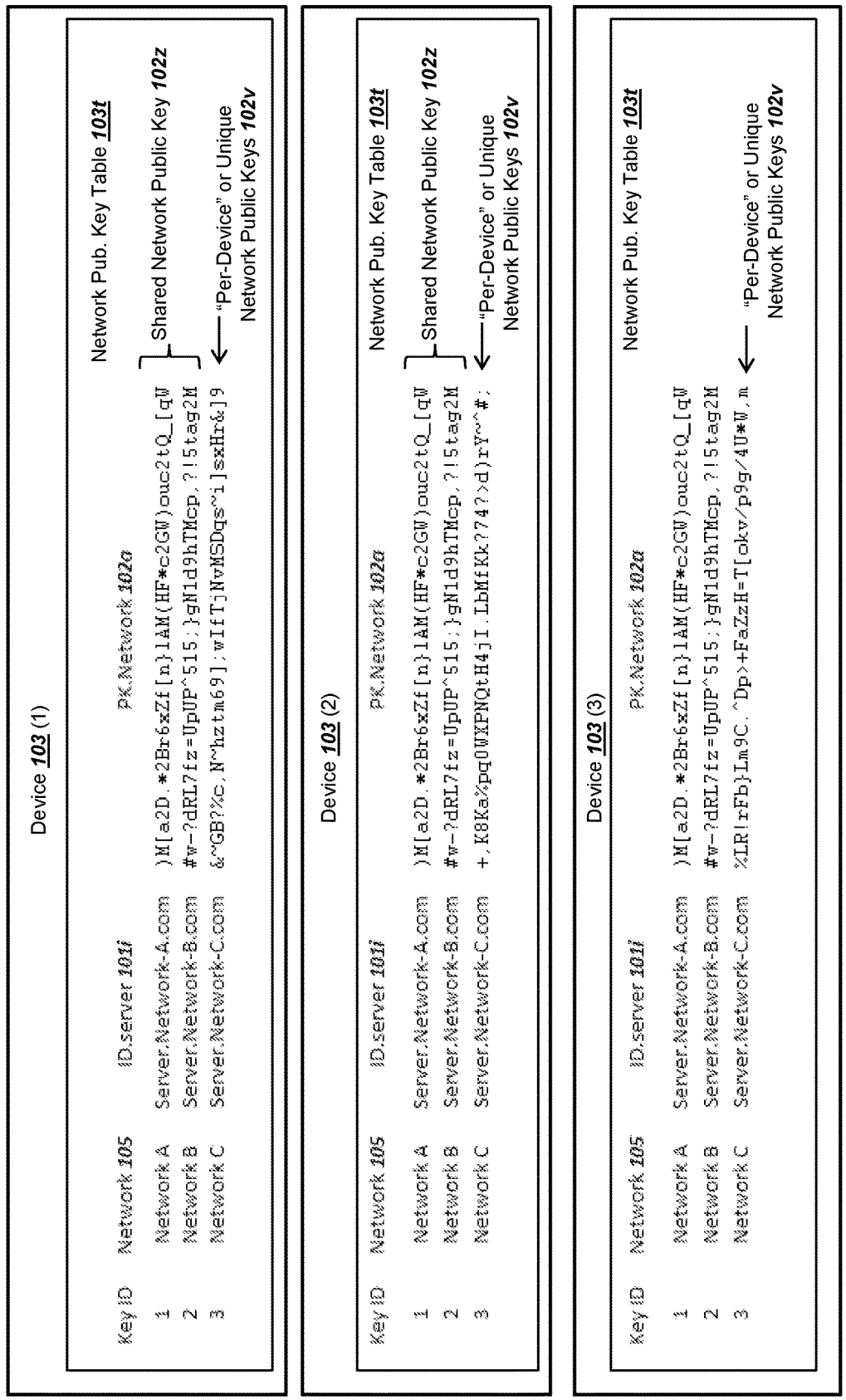
FIG. 1c is an illustration of exemplary network static public keys recorded by a plurality of devices, in accordance with exemplary embodiments.

FIG. 1*c* is an illustration of exemplary network static public keys recorded by a plurality of devices, in accordance with exemplary embodiments. FIG. 1*e* depicts PKI keys recorded for an exemplary three different devices 103, although a system 100 and other systems herein could operate with potentially millions or more devices 103. The data depicted for each device in FIG. 1*c* can comprise exemplary data for a network public key table 103*t* for a device 103, which is also depicted and described in connection with FIG. 1*a* above. The exemplary values recorded for network static public keys depicts different embodiments where both (i) a device 103 can record a network static public key PK.network 102*a* that is shared with other devices 103, and (ii) the network static public key PK.network 102*a* recorded by device 103 could be unique for device 103 (e.g. not shared with other devices 103 in a system 100 above or a system 200 below, as well as other systems herein). A network public key table 103*t* for device 103 can record values of a key identity, a network name for network 105, an identity for server 101 comprising ID.server 101*i*, and also a value for the network static public key PK.network 102*a*. As depicted in FIG. 1*c*, a device 103 can record multiple different values for use with multiple different networks 105 and/or servers 101.

The first two entries for network static public keys PK.network 102*a* for a first device 103 (1) and a second device 103 (2) in FIG. 1*c* depicts the same alphanumeric values for basE91 binary to text encoding for an exemplary network static public keys PK.network 102*a* in a first device 103 (1) and a second device 103 (2), where the key value is depicted for a network 105 of "Network A". Likewise, the second two entries for network static public keys PK.network 102*a* for a first device 103 (1) and a second device 103 (2) in FIG. 1*e* depicts the same alphanumeric values for basE91 binary to text encoding for an exemplary network static public key PK.network 102*a* in a first device 103 (1) and a second device 103 (2). Note that although a single value is depicted for PKI keys in a network public key table 103*t*, the values or numbers for keys recorded could comprise a point on an ECC curve with both an X coordinate and a Y coordinate. For illustration purposes in FIG. 1c, only the X coordinate is displayed and the Y coordinate could be calculated from the X coordinate using the equation for an ECC curve in a set of cryptographic parameters 104a for the PKI keys.

The depiction of these keys PK.network 102a illustrates the use of shared keys 102z for a plurality of different devices 103. Although only two devices are depicted with shared keys 102z, many more devices could also record the same shared keys for PK.network 102a. Each of the shared keys 102z is associated with a different network 105, identified with an exemplary different network name. In this manner, a plurality of different devices 103 can record and use the same value for a network static public key PK.network 102a. As described above, the value in a table 103t including network static public key PK.network 102a could be written in device before the device sends the first message 203 in FIG. 2a below. The data could be recorded by a device manufacturer, a device distributor, or a device owner, and other possibilities exist as well for the source of PK.network 102a without departing from the scope of the present disclosure.

The same values for shared keys 102z across different devices 103 could be recorded in device 103 during manufacturing or before distribution to end users of device 103. In this manner, devices 103 could be received by end users in a "partially configured" yet secure state, such that a device 103 could use the recorded keys PK.network 102a with a server 101 and/or network 105, where a server 101 does not operate or record the corresponding network static private key SK.network 102b. As depicted and described in connection with FIGS. 2a, 2b, etc. below, a key server 102 could record and operate with the corresponding network static private key SK.network 102b and thus the key SK.network 102b can remain secured and not distributed out or sent to a server 101. In this manner, encrypted communications for data 106 in FIG. 1a can be transferred between device 103 and server 101 without server 101 recording the key SK.network 102b. This increases the security of a system 100 and other systems herein, because server 101 may be exposed to an IP network 107 while key server 102 recording the SK.network 102b can be connected to a private network 107a.

By using a set of shared keys 102z across a plurality of device 103, a key server 102 or a network 105 can control access of the devices 103 as a group. For example, a network 105 could deny access to the private key corresponding to the public key for the first depicted value of PK.network 102a in a first device 103 (1). That action by network 105 would also deny a second device 103 (2) access to the private key corresponding to the public key for the first depicted value of PK.network 102a in the second device 103 (2). In this manner, network 105 could control access to a plurality of different devices 103 by controlling access to a single value of SK.network 102b, where (i) the plurality of different devices 103 record the corresponding PK.network 102a as shared keys 102z. Other benefits for using shared keys 102z can be available as well, such as simplifying manufacturing or distribution, since the same key value for PK.network 102a could be recorded with multiple different devices 103. In other words, a device manufacturer or device distributor would not need to keep track of which value for PK.network 102a belongs with which device 103 for embodiments where shared keys 102z are utilized. However, the use of shared keys 102z for multiple different devices 103 is not required for some exemplary embodiments.

In exemplary embodiments, network static public keys PK.network 102a can also comprise a unique key for each device 103 in a system 100 and other systems herein. Thus, some exemplary embodiments also support the use of a network static public key PK.network 102a that is not shared across multiple different devices 103. For these exemplary embodiments, and as depicted in FIG. 1c, a device 103 can record a unique key 102v (depicted as "Per Device or Unique Network Static Public Keys 102v" in FIG. 1c). For example, the depicted value for the third key for device 103 (1), (2), and (3) in FIG. 1c is shown as unique for each device. A key server 102 could also record the corresponding network static private key SK.network 102b that is unique for each device in a key server database 102d as depicted for unique keys 102v in FIG. 1a. In this manner, a network 105 can control access to server 101 and/or network 105 on a per-device basis using the unique key 102v. For example, key server 102 could deny access to device 103 (3) (while continuing to allow service for device 103 (1) and 103 (2)), by denying access or cryptographic operations with the secret key SK.network 102b in a key server 102 corresponding to the public key PK.network 102a recorded by device 103 (3). Other benefits for recording network static public keys PK.network 102a as unique keys 102v for devices 103 exist as well without departing from the scope of the present disclosure. Although not depicted in FIG. 1c, each row or network static public key PK.network 102a could also be stored with a set of cryptographic parameters 104a, such as specifying an ECC named curve associated with the public key 102a. A network 105 or a server ID 101i could be associated with multiple different network static public keys PK.network 102a, where the different keys 102a for the same network 105 or server ID 101i are associated with different parameters 104a. Although depicted as alphanumeric values for the network static public key PK.network 102a, a network public key table 103t could store the public key 102a as separate certificates for the public keys. In addition, a network public key table 103t could store a secure hash value for the network static public key PK.network 102a, where the secure hash algorithm 104d for the secure hash value could be specified by parameters 104, as depicted and described in connection with FIG. 2d below. In addition, a table 103t could include a key server identity 102i associated with the network static public key PK.network 102a.

FIG. 2a

Figure 2A:
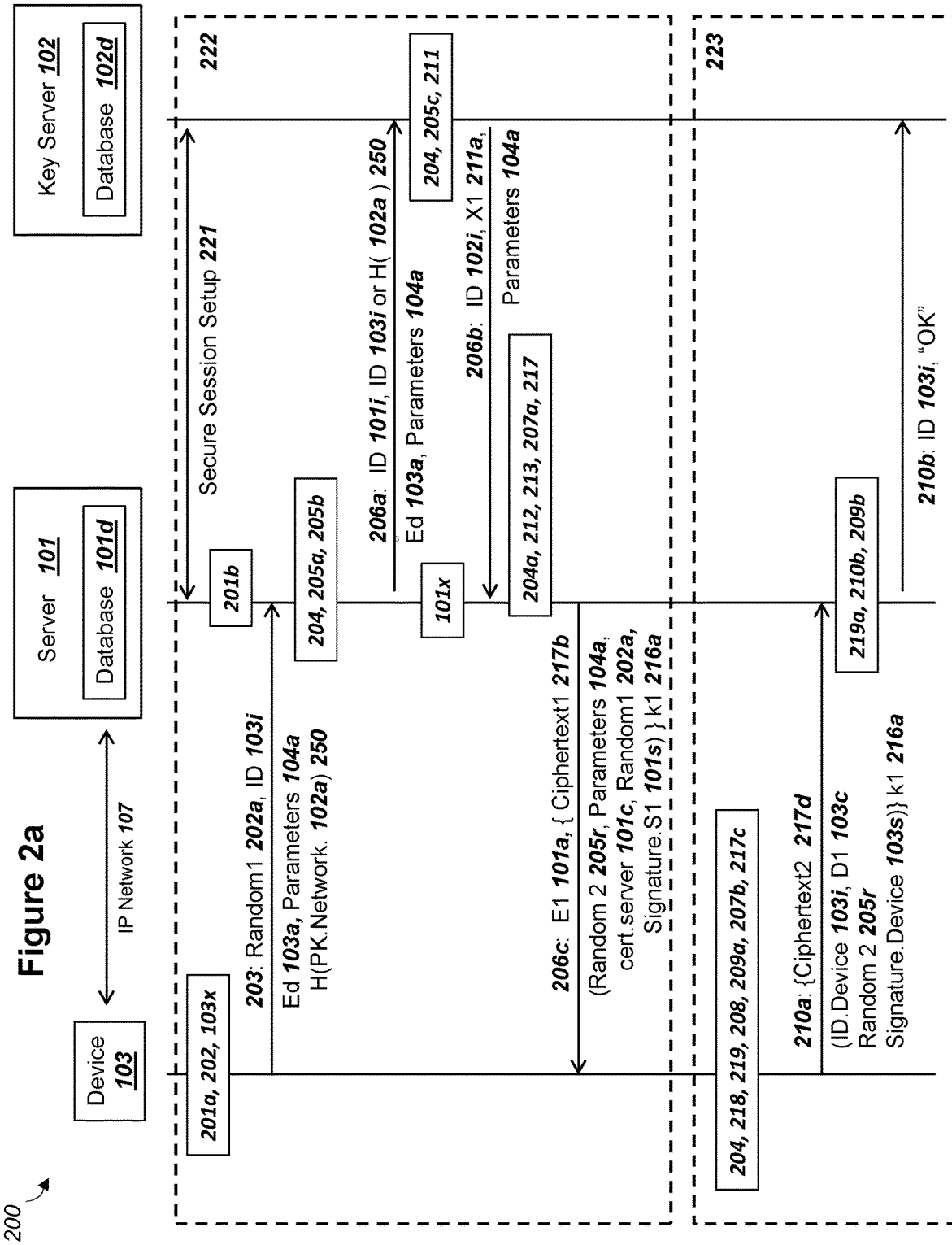
FIG. 2a is a simplified message flow diagram illustrating an exemplary system with exemplary data sent and received by a device, a server, and a key server, in accordance with exemplary embodiments.
Figure 2B:
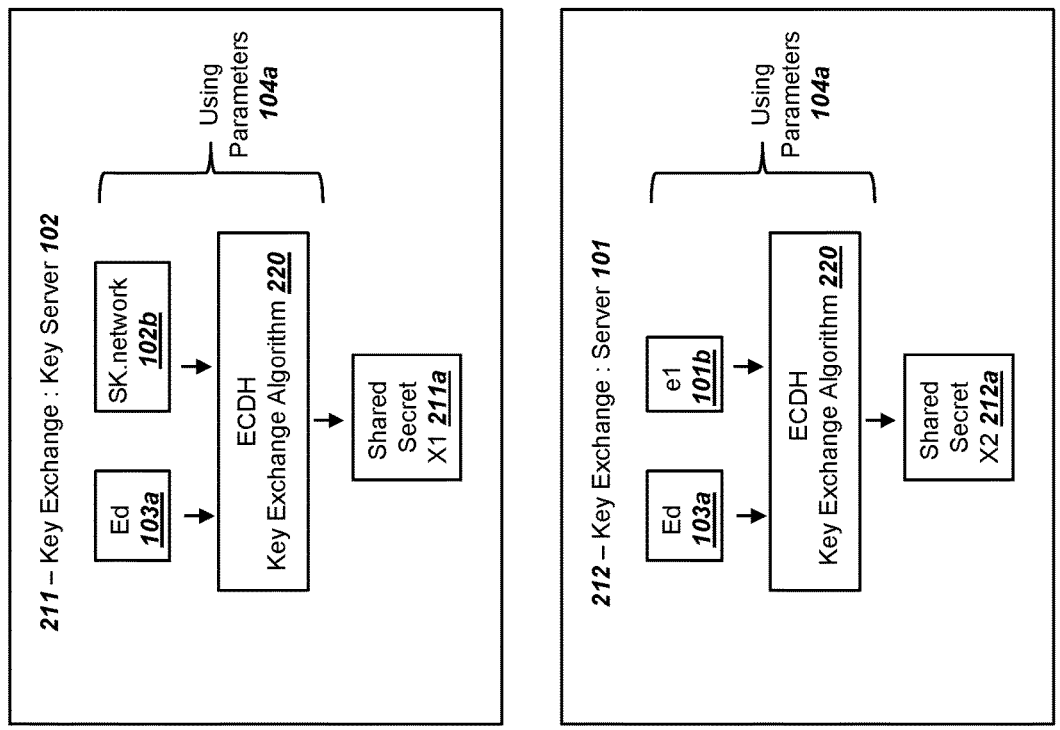
FIG. 2b is a flow chart illustrating exemplary steps for conducting a key exchange using PKI keys in order to derive shared secrets, and for conducting a key derivation function using the derived shared secrets, in accordance with exemplary embodiments.

FIG. 2a is a simplified message flow diagram illustrating an exemplary system with exemplary data sent and received by a device, a server, and a key server, in accordance with exemplary embodiments. System 200 can include a device 103, server 101, and a key server 102. Device 103 was depicted and described in connection with FIG. 1a, and FIG. 1c above. Server 101 and key server 102 were depicted and described in connection with FIG. 1a above, and server 101 was depicted and described in connection with FIG. 1b above. Server 101 can record and operate a server database 101d, and key server 102 can record and operate a database 102d. Individual steps and components used in system 200 in FIG. 2a are also additionally depicted and described in subsequent FIGS. 2b, 2c, and 2d. Before starting the steps and message flows depicted in FIG. 2a, device 103 can securely receive and record a network public key PK.network 102a, which was also depicted and described in connection with FIG. 1a and FIG. 1c. The corresponding private key for PK network 102a can be securely recorded in key server 102 within network 105 as SK.network 102b.

For system 200, server 101 and key server 102 may establish a secure session 221, which could comprise establishing a secure communications link between the two servers using protocols such as TLS, IPSec, a virtual private network (VPN), a secure shell (SSH), or similar networking, transport, or application layer technologies in order to establish secure communications between key server 102 and server 101. Secure session 221 can utilize certificates for the two servers in order to provide mutual authentication and mutual key derivation for a symmetric encryption key in secure session 221. Secure session 221 can also be conducted over private network 107a, although the secure session 221 could also be established or conducted through an IP network 107 such as the globally routable Public Internet. Other possibilities exist as well for establishing a secure session 221 between server 101 and key server 102 without departing from the scope of the present disclosure. Although not depicted in FIG. 2a, firewalls between server 101 and key server 102 could also be utilized in order to establish or conduct secure session 221. At step 201b, server 101 can begin listening for incoming messages from a device 103 using a physical network interface such as WAN interface 101j that provides connectivity to the IP network 107 and server 101 can use a specific port number such as, but not limited to, TCP port 443 to listen for incoming data 106 from a device 103.

At step 201a, device 103 can be powered on and begin operating, in order to establish connectivity with an IP network 107. At step 202, device 103 can read an address for server 101 from memory or a network public key table 103t, and the address can comprise a DNS name or an IP address for server 101. The DNS name or IP address for server 101 could be recorded or received along with the key PK.network 102a, or device 103 could conduct a DNS query to obtain the address. At step 202, device 103 can also read the set of cryptographic parameters 104 and select a subset of the cryptographic parameters 104a in order to establish communications with server 101. An exemplary subset of cryptographic parameters 104a in a step 202 can comprise a member of the set the cryptographic parameters 104 depicted and described in connection with FIG. 2d below (e.g. one line of values in cryptographic parameters 104 in FIG. 2d below). In step 202, device 103 can select a subset of cryptographic parameters 104a that is compatible with PK.network 102a. The subset of cryptographic parameters 104a that are compatible with PK.network 102a could also be recorded in nonvolatile memory in device 103 along with network public key PK.network 102a at the time PK.network 102a was recorded or received by device 103.

A step 202 can also comprise device 103 also using a random number generator in order to output a random number 202a for use in subsequent communications with server 101. Although the term "random number" is described herein, a random number could comprise a pseudo random number processed by device 103 using information entropy available to device 103. The random number 202a processed in a step 202 could contain the number of bits specified by a selected subset of cryptographic parameters 104, such as a random length 104g. Random number 202a generated or derived by a device 103 in a step 202 could also comprise a "number used once" (nonce).

Device 103 can then conduct a key pair generation step 103x as depicted and described in connection with FIG. 1a above using the selected subset of cryptographic parameters 104a. The parameters 104 could specify a named curve and parameters to derive a device ephemeral private key ed 103b and a device ephemeral public key Ed 103a. The device ephemeral private key ed 103b can comprise a random number generated using a random number generator. The device ephemeral public key Ed 103a could be derived using (i) ECC point multiplication from a base point G for a named curve within cryptographic parameters 104a and (ii) the device ephemeral private key ed 103b. Other possibilities exist as well for the steps a device 103 can use in a key pair generation step 103x without departing from the scope of the present disclosure.

Device 103 can then use (i) the recorded address for server 101 (possibly from a table 103t) and (ii) connectivity to IP network 107 from step 202 to send a message 203 to server 101. Message 203 and other messages contemplated herein can be sent as either TCP or UDP messages, and other possibilities exist as well for the formatting and transfer of messages without departing from the scope of the present disclosure. In exemplary embodiments, device 103 both uses an IP address and port number as a source IP address and port to send message 203 to server 101 and then also the same IP address and port number to listen for responses or messages from server 101. In this manner, device 103 can send a message 203 and receive a response message 206c below through an IP network 107, where intermediate nodes on the IP network 107 may conduct network address translation (NAT) routing.

Message 203 can include the random number random1 202a from a step 202, the device ephemeral public key Ed 103a, and the subset of cryptographic parameters 104a. Message 203 may also optionally include a device identity of ID.device 103i, but the device identity of ID.device 103i can also be omitted from a message 203 in some exemplary embodiments. For embodiments where message 203 optionally excluded device identity ID.device 103i, then an identity for device 103i can optionally be transmitted in later messages. Omitting ID.device 103i from message 203 can increase security for message 203 since an identity for device 103 would not be sent as plaintext in a message 203. Although not depicted in FIG. 2a, message 203 could also optionally include an identity for key server 102 comprising ID.key-server 102i, such that server 101 can determine which key server 102i should be associated with message 203. Note that an identity for key server 102 of ID.key-server 102i can be omitted from a message 203, and server 101 can select a key server 102 from other means in a step 205b below.

As depicted in FIG. 2a, message 203 could also optionally include a secure hash value 250 (also depicted in FIG. 2d below) such as, but not limited to, SHA-256 of the network static public key PK.network 102a. Device 103 can send the hash value 250 of key 102a to server 101 in a message 203, in order for server 101 to identify which of a plurality of possible key servers 102 could be used to process data within message 203, which is further described for a step 205b below. For embodiments where a secure hash value 250 of key 102a is included in a message 203, then the message 203 could optionally exclude the selected subset of cryptographic parameters 104a associated with keys PK.network 102a and Ed 103a. For other embodiments, a key identity for key 102a could be selected by device 103 from a table 103t and the key identity for key 102a could be sent in a message 203 instead of a hash value 205 for key 102a. A server 101 and key server 102 could store the key identity for key 102a and select the key 102a using the key identity for key 102a.

Server 101 receiving the message 203 with the hash value 250 could determine the set of parameters 104a to use for key Ed 103a based on the hash value 250. For example, and as depicted in FIG. 2d below, a server database 101d could maintain mapping of hash values 250 and parameters 104a, and server 101 could conduct a query of database 101d using the received hash value 250 in order to select the parameters 104a for further processing and cryptographic operations with key Ed 103a. Or, in an exemplary embodiment cryptographic parameters 104a as transmitted via an IP network 107 or private network 107a could comprise the secure hash 250 of key 102a, where the secure hash 250 of key 102a can specify which subset of a set of cryptographic parameters 104 to utilize for ECC operations (in other words the subset of parameters 104 can comprise parameters 104a). For embodiments where device 103 uses a unique key 102v, then the secure hash value 250 can also comprise a device identity 103i (since the secure hash value 250 would be unique for device 103). Secure hash value 250 could also be omitted from message 203 in some exemplary embodiments.

Server 101 can receive message 203 and begin conducting steps in order to process the message. At step 204, server 101 can read the subset of cryptographic parameters 104a in the message 203 and being using the subset of cryptographic parameters. Or, for embodiments that include hash value 250, then parameters 104a could be omitted from message 203 and server 101 could select the parameters 104a from a server database 101d using the hash value 205, such as with the exemplary server database depicted in FIG. 2d below. At step 204, server 101 can comprise a public key validation step on received device ephemeral public key Ed 103a in order to ensure the key is valid and on the selected curve in parameters 104a. Step 204 by server 101 can comprise conducting the steps for an ECC Full Public-Key Validation Routine in section 5.6.2.3.2 of FIPS publication SP 800-56A (revision 2) for the received device ephemeral public key Ed 103a. Alternatively, step 204 can comprise server 101 performing the steps ECC Partial Public-Key Validation Routine in section 5.6.2.3.3 of the same FIPS publication. Other example steps within a public key validation step 204 can comprise (i) verifying the public key is not at the "point of infinity", and (ii) verifying the coordinates of the point for the public key are in the range [0, p−1], where p is the prime defining the finite field. Other possibilities exist as well for evaluating and validating a received public key is cryptographically secure in a public key validation step 204, without departing from the scope of the present disclosure. As contemplated in the present disclosure a device 103, server 101, and key server 102 can conduct a public key validation step 204 each time a public key or a point on an elliptic curve is received.

At step 205a and after a key validation step 204, server 101 can record the data received from the message 203 in a server database 101d. Exemplary values and data for a server database 101d are depicted and described in connection with FIG. 2d below. At step 205a, server 101 can record in server database 101d the values of random number 202a, device ephemeral public key Ed 103a, and the subset of cryptographic parameters 104d. For embodiments where device identity ID.device 103i is also received in message 203, then server 101 can also record device identity ID.device 103i in server database 101d. A step 205a can also include (i) storing both Ed 101a and random1 202a in database 101d, and (ii) confirming that Ed 101a and random1 202a are not reused. Security of a system 200 and system 100 and other systems herein can be increased through prohibiting the reuse of ephemeral PKI key pairs and also random numbers. If numbers or keys are reused, then server 101 could respond with a request for device 103 to generate a new ephemeral PKI key pair and/or random number 202a before proceeding to further steps. For embodiments requiring higher security, then hash values for received keys Ed 101a could be stored in a database 101d (instead of the value of key Ed 101a), and a new Ed 101a received by server 101 could be determined as new or reused by calculating a hash value for the received key Ed 101a and comparing with stored values for Ed 101a.

At step 205a, server 103 can also record the originating source IP address and port number 203a (depicted in FIG. 2d below) for message 203, in order to subsequently transmit a message 206c below back to the same IP address and port number. In this manner, message 206c below can be routed by intermediate nodes on IP network 107 back to the source IP address and port number used by device 103 to transmit message 203. In other words, (i) the destination IP address and port number of a subsequent message 206c from server 101 to device 103 can comprise the source IP address and port number 203a (depicted in FIG. 2d below) received in message 203, and (ii) the source IP address and port number 203a (depicted in FIG. 2d below) from message 203 can be recorded in a server database 101d. In this manner, device 103 can be tracked or identified by server 101 during the brief period of time of the message flows in FIG. 2a using the source IP address and port number from message 203 for embodiments where device identity ID.device 103i is not included in message 203. A step 205a can also comprise server 101 generating a second random number 205r using parameters 104a for use in subsequent messages with device 103. The first random number can comprise random number random1 202a derived by device 103.

At step 205b, server 101 can select key server 102 for subsequent communications and processing of the received device ephemeral public key Ed 103a. Note that a system 100 could comprise both a plurality of devices 103 and a plurality of key servers 102. In exemplary embodiments server 101 should select in step 205b the proper key server 102 for conducting subsequent steps in FIG. 2a. In other words, without data or values from a message 203, server 101 may know which of a possible plurality of key server 102 may record the network static private key SK.network 102b for use with or associated with device ephemeral public key Ed 103a. Server 101 could use one of several possible methods for selecting key server 102 in a step 205b, including a combination of the following embodiments.

A first embodiment for selecting key server 102 in a step 205b could comprise server 101 selecting the same key server 102 for all keys Ed 103a from all devices 103. For example for this first method, server 101 could listen or operate on (i) a specific IP address and port number or (ii) with a specific DNS name or server name indicator (SNI) in step 201b, where the use of (i) or (ii) could be specified or associated with network static public key PK.network 102a. As mentioned above for a step 201a, device 103 can select the address of server 101 using the server address of server 101 recorded with PK.network 102a (possibly from a table 103t in FIG. 1c). Server 101 could determine that all messages 203 received using (i) or (ii) are associated with a specific key server 102. For this first embodiment of a step 205b, a plurality of devices 103 could store shared keys 102v for PK.network 102a, as depicted and described in connection with FIG. 1c.

A second embodiment of a step 205b for selecting key server 102 of received device ephemeral public key Ed 103a could comprise using an identity of key server 102 in a message 203 from device 103. As described above for a message 203, the message 203 can optionally include an identity for key server 102 comprising ID.key-server 102*i*. For these embodiments, server 101 can select the key server 102 using the ID.key-server 102*i* in message 203. A third embodiment for a step 205*b* of selecting key server 102 for received device ephemeral public key Ed 103*a* could comprise using an identity of device 103 in a message 203 comprising ID.device 103*i*. As described above for a message 203, the message 203 can optionally include an identity for device 103, and server 101 using database 101*d* could include a table to map ID.device 103*i* to key server 102. For this third embodiment of a step 205*b*, server 101 could conduct a query of server database 101*d* to select the key server 102 for device 103 using ID.device 103*i*.

A fourth embodiment for a step 205*b* to select a key server 102 for received device ephemeral public key Ed 103*a* could comprise using the subset of cryptographic parameters 104*a* in a message 203 from device 103. Server 101 could record that a first subset of cryptographic parameters 104*a* are associated with a first key server 102, and a second subset of cryptographic parameters 104*a* are associated with a second key server 102, etc. A fifth embodiment for a step 205*b* to select a key server 102 for received device ephemeral public key Ed 103*a* could comprise message 205 including a secure hash value 250 (in FIG. 2*d*) of network static public key PK.network 102*a*, and server 101 with database 103*d* could include a table to map the secure hash value 250 of PK.network 102*a* to key server 102. Other possibilities exist as well for server 101 to conduct a step 205*b* to select a key server 102 using data in a message 203 without departing from the scope of the present disclosure. For embodiments of step 205*b*, the selection of key server 102 can comprise the selection of an identity for key server 102 of key server identity 102*i*, and subsequent data such as message 206*a* could be sent or routed through IP network 107*a* using the key server identity 102*i*.

After selecting key server 102 in a step 205*b*, server 101 can then send key server 102 a message 206*a* through the secure session 221. Message 206*a* can include an identity for server 101 comprising ID.server 101*i*, the received device ephemeral public key Ed 103*a*, and the subset of cryptographic parameters 104*a*. For embodiments where device identity ID.device 103*i* was included in a message 203, then ID.device 103*i* could be included in a message 206*a* as well. However, device identity ID.device 103*i* could be omitted from a message 203 and for these embodiments then message 206*a* can exclude device identity ID.device 103*i* as well. Server identity ID.server 103*i* can be useful for communications between key server 102 and server 101 for a system 100 and system 200, since either (i) server 101 may communicate with a plurality of different key servers 102, and/or (ii) key server 102 may communicate with a plurality of different servers 101.

Server 101 can then conduct a key pair generation step 101*x* as depicted and described in connection with FIG. 1*a* above using the selected subset of cryptographic parameters 104*a*. The parameters 104*a* could specify a named curve and parameters to derive a server ephemeral private key e1 101*b* and a server ephemeral public key E1 101*a*. The server ephemeral private key e1 101*b* can comprise a random number generated using a random number generator. The server ephemeral public key E1 101*a* could be derived using (i) ECC point multiplication from a base point G for a named curve within cryptographic parameters 104*a* and (ii) the server ephemeral private key e1 101*b*. Although message 206*a* is depicted in FIG. 2*a* as transmitted or sent by server 101 to key server 102 before server 101 derives ephemeral server PKI keys in a step 101*x*, a message 206*a* could be sent by server 101 after server 101 conducts the step 101*x*. Key pair generation step 101*x* can also confirm that the server ephemeral PKI key pair for server 101 is not reused, such as storing hash values for public keys E1 101*a* in a database 101*d* and then comparing the hash value for a new key E1 101*a* from a step 101*x* with the stored hash values. If the derived new key E1 101*a* matches a stored hash value 101*a* from a database 101*d*, then the new key E1 101*a* could be discarded and a different key E1 101*a* derived.

Key server 102 can receive the message 206*a* via the secure session 221 and conduct a series of steps to process the message and respond. A first step conducted by key server 102 can comprise a key validation step 204, where the key validation step 204 conducted by key server 102 can be equivalent or compatible with the key validation step 204 conducted by a server 101 as described above. For a key validation step 204, a node can reply with a failure or reject message if the key validation step 204 fails, such as if a received ECC public key fails to fall on the named elliptic curve as specified by a subset of cryptographic parameters 104*a*.

At step 205*c*, key server 102 can use data from message 206*a* in order to select a network static private key SK.network 102*b* for subsequent steps such as a step 211. For embodiments where message 206*a* includes either (i) an identity for device 103 such as ID.device 103*i*, or (ii) identifying information for SK.network 102*b* for key server 102 to utilize (such as hash 250 of the public key PK.network 102*a* for SK.network 102*b*), then key server 102 could use the identifying information in message 206*a* to select the network static private key SK.network 102*b* from a key server database 102*d*, where an exemplary key server database 102*d* is depicted and described in connection with in FIG. 1*a* above. For some exemplary embodiments, the key server database 102*d* can record a network static private key SK.network 102*b* for each set of cryptographic parameters 104*a*, and subsequently select the key 102*b* using the parameters 104*a* received in a message 206*a*. In other words, an identity for device 103 or hash 250 of PK.network 102*a* could be omitted, and a key server 102 could use a step 205*c* to select a network static private key SK.network 102*b* using a set of cryptographic parameters 104*a*.

Key server 102 can then conduct an ECDH key exchange step 211 using (i) the selected network static private key SK.network 102*b*, (ii) the received device ephemeral public key Ed 103*a*, and (iii) the set of cryptographic parameters 104*a*. Exemplary details for an ECDH key exchange step 211 are depicted and described in connection with FIG. 2*b* below. The output of an ECDH key exchange step 211 can comprise point X1 211*a*.

Key server 102 can then send server 101 a message 206*b*, where the message 206*b* includes point X1 211*a*, as well as an identity for key server 102 comprising ID.key-server 102*i* and cryptographic parameters 104*a* associated with point X1 211*a*. Message 206*b* can be transmitted through secure session 221. If device identity 103*i* or other identifying information such as hash 250 was included in message 206*a*, then message 206*b* could also include device identity 103*i* or the other identifying information for a device 103. Or, both message 206*a* and message 206*b* can include a transaction identity or session identity, such that server 101 can associate the received value X1 211*a* with a received device ephemeral public key Ed 103*a*.

Server 101 can receive message 206*a* with point X1 211*a* and conduct a series of steps in order to derive a mutually shared and authenticated key exchange with device 103. As contemplated herein, the authentication performed by server 101 can comprise a "one-way" authentication with device 103. Authentication of server 101 or network 105 can be provided by the depicted key exchange with steps 211 and 213, since network 105 from system 100 with both server 101 and key server 102 conducts an ECDH key exchange using at least, in part, the network static private key SK.network 102b. The "one-way" authentication from the ECDH key exchange is also not completed until both sides have successfully used a symmetric ciphering key derived from the ECDH key exchange. In other words, a device that successfully mutually derives a symmetric ciphering key with a server 101 can authenticate that server 101 has secure access to the network static private key SK.network 102b. One benefit of the system depicted in FIG. 2a is that the network static private key SK.network 102b does not need to be recorded by or operated with server 101. Further authentication of both parties can be completed via other means including digital signatures in later steps, and the "one-way" authentication in this paragraph refers to the authentication that results from using the ECDH key exchange using at least network static private key SK.network 102b.

Note that the authenticated ECDH key exchange depicted in FIG. 2a, with additional details in subsequent Figures, can solve problems in the art discussed in the Description of Related Art. Specifically, through the use of a PK.network 102a recorded by a device and SK.network 102b recorded by a network 105, combined with the use of ephemeral PKI keys for both device 103 and server 101, the depicted and described ECDH key exchange herein can simultaneously achieve both (i) authentication of a network 105 with device 103 and (ii) forward secrecy. As discussed in the Description of Related Art, a device 103 may not have full access to the Internet (such as other servers or networks besides those for a network 105), or other resource limitations such as not storing (x) intermediate certificate authority certificates for servers or (y) compatible parameters or algorithms for intermediate certificate authority certificates for servers, and consequently device 103 may not be able to readily verify a certificate for server 103 such as cert, server 101c without storing and using (x) and (y) above. The mutually authenticated ECDH key exchange with forward secrecy depicted in FIG. 2a and subsequent Figures herein supports devices with those limitations. Other benefits are possible as well, such as faster and less resource-intensive authentication of a network 105 with device 103.

After receiving message 206a, server 101 can conduct a point validation step 204a for received value or point X1 211a. Note that point validation step 204a is related to a key validation step 204 and can use several of the same sub-steps depicted and described for a key validation step 204 for server 101 above. A point validation step 204a is different than a key validation step 204 since (i) the value X1 211a is preferably not used as a public key to be shared with other parties, but rather (ii) represents a point on the ECC curve from parameters 104a that will subsequently undergo a point addition operation in order to mutually derive a shared secret with device 103. Further, point X1 211a can be received through a secure session 221 with a trusted party comprising key server 102, and thus the point X1 211a can have a higher level of confidence or trust as being correct and properly formatted than a device ephemeral public key Ed 103a received potentially via the Public Internet. A point validation step 204a for server 101 can comprise verifying that received point X1 211a is on the ECC curve as specified in parameters 104a and that the point is not the "point at infinity". Other possibilities exist as well for conducting a point validation step 204a on the received point X1 211a without departing from the scope of the present disclosure.

After conducting a point validation step 204a, server 101 can then conduct an ECDH key exchange step 212, where a key exchange step 212 is depicted and described in connection with FIG. 2b below. In summary, server 101 can input (i) the server derived ephemeral private key e1 101b from a step 101x and (ii) the received device ephemeral public key Ed 103a from message 203 into an ECDH key exchange algorithm 220 (in FIG. 2b) in order to calculate a point X2 212a. Server 101 can then conduct a key derivation step 213 as depicted and described in connection with FIG. 2b below. In summary, server 101 can conduct an ECC point addition step 214 (in FIG. 2b) using both (i) point X1 211a from message 206b and (ii) point X2 212a from step 212 in order to mutually derive a shared secret X3 213a. Shared secret X3 213a can be input into a key derivation function in order to output a symmetric ciphering key K1 216a and also optionally a MAC key.

Server 101 can then conduct a step 207a to create a digital signature 101s, using an elliptic curve digital signature algorithm (ECDSA) over the values of at least, in part, random number random1 202a and random number random2 205r. The ECDSA could use (i) the private key corresponding to the public key in certificate cert.server 101c as (ii) the private key for creating digital signature 101s in a step 207a. The ECDSA can be compatible with IETF RFC 6979, IETF RFC 4574, and also related FIPS standards or other standards for digital signatures using ECC PKI keys. Additional data to sign for signature 101s in a step 207a could comprise the cryptographic parameters 104a and the certificate cert.server 101c. In addition, other digital signature algorithms besides ECDSA could be used in a step 207a such as the use of RSA based digital signature algorithms, or even post-quantum cryptography algorithms. If other digital signature algorithms besides ECDSA are used in a step 207a, then the public key in certificate cert.server 101c and corresponding private key can support the other digital signature algorithms. In general, the digital signature algorithms used to create digital signature 101s can support cryptographic algorithms and PKI keys that are different than the set of cryptographic algorithms 104 in order to conduct a mutually authenticated ECDH key exchange with forward secrecy as contemplated herein.

Server 101 can then conduct an encryption step 217 (i) using the key K1 216a output from key derivation step 213 in order to (ii) create a ciphertext1 217b. Exemplary details for an encryption step 217 is depicted and described in connection with FIG. 2c below, and an encryption step 217 can use a symmetric ciphering algorithm. The plaintext within ciphertext1 217b can comprise at least, in part, the random number random1 202a and random number random2 205r. Other data could be included in plaintext for ciphertext 217b such as the certificate cert, server 101c, digital signature 101s, as well as parameters 104a, without departing from the scope of the present disclosure. For some exemplary embodiments the use or inclusion of a certificate cert.server 101c and digital signature 101s for plaintext in ciphertext 217b could be omitted, since the mutually derived symmetric ciphering key K1 216a can be derived with authentication of server 101 and network 105 to device 103.

Server 101 can then send device 103 a message 206c, where the destination IP address and port number of message 206c can comprise the source IP address and port number 203a received with message 203 and recorded in server database 101d. Message 206c can include the server ephemeral public key E1 101a and the ciphertext1 217b, as depicted in FIG. 2a. The value "K1 216a" depicted in FIG. 2a is shown to illustrated that the derived symmetric ciphering key 216a from a key derivation step 213 is used to encrypt ciphertex1 217b (indicated by the brackets shown in FIG. 2a for message 206c), and the value K1 216a is not normally transmitted as plaintext or ciphertext in message 206c. Ciphertext1 217b can include plaintext values of random number random1 202a, parameters 104a, certificate cert.server 101c, random number random2 205r, and signature 101s. Other data could be included as plaintext in ciphertext 217b such as extensions for a TLS or DTLS handshake, data supporting an application for device 103, and other possibilities exist as well. As depicted in FIG. 2a, the series of steps and messages beginning with step 201a for device 103 though the receipt of message 206c by device 103 can comprise a step 222, where the combined step 222 can be used in additional embodiments depicted below.

As contemplated in the present disclosure, a message such as message 206c and also other messages such as message 203, message 206a, etc. can be transmitted or sent in parts, where the data for the message can be transmitted and received in separate datagrams or portions over time. For these embodiments, the message can comprise the collection of separate datagrams or portions transmitted or sent separately. For example, with separate datagrams or portions for a message 206c in FIG. 2a, a first datagram or portion for message 206c could comprise server ephemeral public key E1 101a, which could be sent (i) after a key pair generation step 101x, and (ii) before receiving message 206a from key server 102. A second datagram or portion for message 206c could comprise ciphertext1 217b, which could be sent after server 101 receives message 206a from key server 102. In this manner, by sending message 206c as a first portion and a second portion, the overall speed of conducting a step 223 for device 103 could be increased. For example, by receiving the first portion of message 206c comprising key E1 101a, device 103 could then (a) begin conducting steps below of 204 and 218, while (b) waiting for the second portion of message 206c comprising ciphertext1 217b to be sent separately and after the first portion. By increasing the overall speed for conducting a step 223 for device 103, then electrical power consumption or battery usage for device 103 can be reduced. Other possibilities and benefits from sending a message in the present disclosure as a first portion and a second portion, without departing from the scope of the present disclosure. Messages depicted and described herein may be sent and received as multiple portions over time, where the message can comprise the collection of the multiple portions.

Device 103 can then receive message 206c and conduct a series of steps in order to process the message. Device 103 can conduct a key validation step 204 in order to verify that server ephemeral public key E1 101a in message 206c is properly formatted and is a valid point on the named curve for parameters 104a. Validation step 204 for device 103 can be equivalent to the validation step 204 for server 101 described above. Device 103 can then conduct an ephemeral ECDH (ECDHE) key exchange step 218 in order to mutually derive symmetric ciphering key K1 216a. Details for an ECDHE key exchange step 218 is depicted and described in connection with FIG. 2c below. In summary, device 103, using parameters 104a, can perform an elliptic curve point addition operation on (i) the server ephemeral public key E1 101a received in message 206c and (ii) the recorded network static public key PK.network 102a. Device 103 can input (i) the point derived from ECC point addition and (ii) the device ephemeral private key ed 103b into an ECDH key exchange algorithm in order to mutually derive shared secret key X3 215 with server 101. The mutual derivation of shared secret key X3 215 by server 101 is depicted and described in connection with key exchange step 213 for server 101 in FIG. 2b below. Device 103 can input shared secret key X3 215 into a key derivation function in order to mutually derive symmetric ciphering key K1 216a. Note that a MAC key could also be derived in step 218.

Device 103 can then perform a decryption step 219 in order to decrypt ciphertext1 217b from message 206c using the derived symmetric ciphering key K1 216a from the key exchange step 218, where symmetric ciphering key K1 216a was derived as described in the paragraph above. A decryption step 219 is also depicted and described in connection with FIG. 2c below. Device 103 can then read the plaintext within ciphertext1 217b, as well as verifying message integrity of ciphertext1 217b using a MAC key derived in a step 218. Device 103 in a decryption step 219 can read the plaintext values of random number random1 202a, random number random2 205r, and certificate cert.server 101c, as well as a digital signature 101s. Note that digital signature 101s can be over at least the random number random1 202a that device 103 sent in a message 203.

At step 208, device 103 can conduct a verification step for the plaintext certificate cert.server 101c in order to validate the certificate. Device 103 in a step 208 can verify a signature from a certificate authority for the server static public key PK.server 101p in the certificate (plus any intermediate certificate signatures) using a root certificate for the certificate authority. The root certificate for the certificate authority could be recorded in a nonvolatile memory for device 103. Device 103 can verify both the certificate authority signature in cert.server 101c using an elliptic curve digital signature algorithm (ECDSA). The ECDSA could use a certificate authority public key for from a root certificate for verifying the certificate authority signature in a certificate cert.server 101c. The ECDSA can be compatible with IETF RFC 6979, IETF RFC 4574, and also FIPS 186-4 standards or related and subsequent standards for digital signatures using ECC PKI keys.

Note that a certificate cert.server 101c could also specify parameters different than the use of an ECC algorithm, such as using RSA based signatures. For these embodiments using RSA based keys for digital signatures, device 103 could use a digital signature algorithm (DSA) and server static public key PK.server 101p can comprise an RSA-based key. Note that in some exemplary embodiments, the use of a server certificate cert.server 101c could be omitted, since device 103 can authenticate server 101 using the authenticated ECDH key exchange step 218 (where successful decryption of ciphertext1 217b proves to device 103 that server 101 has access to SK.network 102b). Further, a server certificate cert.server 101c could be included in a message 206c and ciphertext1 217b, but device 103 could omit a separate certificate verification step 208 and still trust the server public key PK.S1 101p in a cert.server 101c. In other words, successful decryption of the cert.server 101c with the symmetric ciphering key K1 216a can signal or indicate that cert.server 101c can be trusted using the stored PK.network 102a, since the cert, server 101c could only be encrypted by a server 101 with access to SK.network 102b.

After a step 208 to verify certificate cert.server 101c, device 103 can conduct a signature verification step 209a to verify signature 101s. For a step 209, device 103 could use the server static public key PK.server 101p for server 101 from certificate cert.server 101c and an ECDSA signature algorithm in order to verify signature 101s. The signed data verified by a signature verification step 209a can comprise at least, in part, both random number random1 202a from device 103 and random number random2 205r from server 101, as well as other data within message 206c such as certificate cert.server 101c. If the signature verification step 209a fails, then device 103 can stop further processing of message 206c and return an error message.

Device 103 can conduct a signature creation step 207b in order to create digital signature 103s over data received in message 206c. The data signed by a signature creation step 207b for signature 103s can comprise at least, in part, random number random2 205r. A set of parameters 104a can specify values and settings to utilize with an ECDSA in a step 209a, such as a secure hash algorithm to utilize, the use of a deterministic ECC signature algorithm (avoiding the need to include a unique random number from device 103 with the signature 103s), padding rules, encoding rules, etc. Device 103 can use device private key d1 101d in order to create signature 103s.

Device 103 can then conduct an encryption step 217c, where encryption step 217c can use the exemplary encryption step 217 depicted and described below in FIG. 2c with different plaintext data than the depicted data for a step 217 in FIG. 2c. The encryption key for a step 217c can comprise the symmetric ciphering key K1 216a derived by device 103 above in a step 218, and a MAC key 216b (from FIG. 2c below) can also be utilized. In some exemplary embodiments, the encryption step 217c can use a different symmetric ciphering key K1 216a than key K1 216a used by server 101 to encrypt ciphertext1 217b. In other words, different symmetric ciphering keys could be used by (i) server 101 to encrypt ciphertext1 217b and (ii) device 103 to encrypt a ciphertext 217d. However, both server 101 and device 103 can mutually derive the different symmetric ciphering keys using at least the mutually derived shared secret X3 215. For some exemplary embodiments, the key K1 216a from a KDF 216 can comprise two portions, where (i) a first portion is used by server 101 to encrypt data and device 103 to decrypt data and (ii) a second portion is used by device 103 to encrypt data and server 101 to decrypt data.

The plaintext data for an encryption step 217c can comprise at least, in part, an identity for device 103 of ID.device 103i, and the random number random2 205r from server 101. Other data could be included in the plaintext for an encryption step 217c without departing from the scope of the present disclosure, such as, but not limited to, data from a transducer connected to device 103. In addition, the device 103 static public key D1 103c, or a certificate for device 103 with public key D1 103c could be included as plaintext data for an encryption step 217c. The output of an encryption step 217c can comprise ciphertext2 217d, as depicted in FIG. 2a. As depicted and described in connection with FIG. 2c below, the output of an encryption step 217c could also include an initialization vector and a MAC code, which could be included as metadata or plaintext along with ciphertext2 217d in a message 210a. The initialization vector can be used to chain blocks in order to scramble data across the multiple blocks and the MAC code can be used to confirm message integrity using a MAC key output from key exchange algorithm 218. For embodiments where server 101 could store or receive device static public key D1 103c before receiving a message 210a (such as receiving the key D1 103c from a server associated with device 103), then key D1 103c and/or a certificate for device 103 could be omitted from ciphertext2 217d and a message 210a.

After step 217c, device 103 can send server 101 a message 210a, where message 210a can include ciphertext2 217c. In exemplary embodiments, message 210a is transmitted by device 103 using the same source IP address and port number as message 203. In addition, message 210a is transmitted by device 103 using the same destination IP address and port number for server 101 as message 203. Although the signature 103s is depicted in FIG. 2a as being internal to ciphertext2 217c, in some exemplary embodiments signature 103s can be external to ciphertext2 217c. Likewise, although a signature 101s is depicted as within a ciphertext 217b from server 101, in some embodiments a signature 101s could be external to ciphertext 217b in a message 206c. Server 101 can receive message 210a by listening to the same local IP address and port number used to receive message 203 above.

After server 101 receives message 210a, server 101 can conduct a series of steps in order to process the message. Server 101 can conduct a decryption step 219a, which can comprise a decryption step 219 depicted and described below in connection with FIG. 2c, but with different ciphertext data. The ciphertext data for a decryption step 219a can comprise the ciphertext2 217e received by server 101 in message 210a. A decryption step 219a can also use an initialization vector and MAC code received along with ciphertext2 217c in message 210a. After conducting a decryption step 219a, server 101 can read the plaintext data within ciphertext2 217c. In exemplary embodiments, the plaintext data can include an identity for device 103 of ID.device 103i, the device static public key D1 103c, and also the random number random2 205r. Although not depicted in FIG. 2a, ciphertext2 217a as received by server 101 can include input from a transducer or sensor operated by device 103, such as, but not limited to, keyboard input, temperature data from a thermocouple or thermistor, pressure data from a transducer, the state of an actuator, the state of an electronic switch, gate, or relay, etc. operated by device 103. Other possibilities exist as well for transducer data in ciphertext2 217a which is decrypted into plaintext by server 101 in a decryption step 219a without departing from the scope of the present disclosure.

At step 210b, server 101 can process the plaintext data output from a decryption step 219a. Server 101 can read and record the device identity ID.device 103i for use in subsequent messages. Server 101 can read the value for random number random2 205r to confirm the value or number equals the random number random2 205r sent above in message 206c. In exemplary embodiments, server 101 can record the plaintext data decrypted from ciphertext2 217c in a server database 101d along with a timestamp, after completing the signature verification step 209c. Server 101 can conduct a signature verification step 209b for signature 103s using the same signature verification algorithm and parameters as signature verification step 209a, except using the device static public key D1 103c. Parameters 104 can specify settings or values for conducting a signature verification step 209a. In exemplary embodiments, signature verification step 209b comprises an ECDSA signature verification for digital signature 103s using key D1 103c. Note that signature 103s is over data that includes at least random number random2 205r sent by server 101 in message 206c. Device static public key D1 103c could be recorded in nonvolatile memory or disk storage of server 101 as depicted in FIG. 1b above.

Upon successful completion of a signature verification step 209b for digital signature 103s, server 101 and device 103 can conduct additional steps to securely transfer data 106 between the two nodes. Although not depicted in FIG. 2a, server 101 could send device 103 commands, files, configuration data, or other data using ciphertext encrypted with derived symmetric ciphering keys. Server 101 and device 103 could also update key K1 216a or rotate key K1 216a using a key derivation function (such as key derivation function 216 depicted in FIG. 2b and FIG. 2c below). As depicted in FIG. 2a, after a step 210b and a step 209b, server 101 can send key server 102 a message 210b, where message 210b can include the device identity ID.device 103i and an "OK" message, where the "OK" signals to key server 102 that server 101 and device 103 have successfully derived and used symmetric ciphering key 216a using PKI keys and an ECDH point addition of shared secret X1 211a and X2 212a. As depicted in FIG. 2a, the series of steps beginning with a step 204 for device 103 through the receipt of message 210b can collectively comprise a step 223.

FIG. 2b

FIG. 2b is a flow chart illustrating exemplary steps for conducting a key exchange using PKI keys in order to derive shared secrets, and for conducting a key derivation function using the derived shared secrets, in accordance with exemplary embodiments. Key server 102 can conduct a key exchange step 211 in order to derived a secret key X1 211a. Server 101 can conduct a key exchange step 212 in order to derive a secret key X2 212a. Server 101 can receive the secret key X1 211a in a message 206b from key server 102 in FIG. 2a above through a secure connection 221. Server 101 can then conduct a key derivation function 213 using shared secrets X1 211a and X2 212a in order to derive a symmetric ciphering key K1 216a. Using the methods and ECC PKI keys described in the present disclosure, a device 103 can also derive the same symmetric ciphering key K1 216a as depicted and described below for a key exchange step 218 in FIG. 2c. In other words, for exemplary embodiments (i) the corresponding key exchange step 218 (in FIG. 2c below) for a device 103 by network 105 can be (ii) shared or distributed between a server 101 and key server 102 in order to secure or isolate network static private key SK.network 102b.

The processes and operations, described below with respect to all of the logic flow diagrams and flow charts may include the manipulation of signals by a processor and the maintenance of these signals within data structures resident in one or more memory storage devices. For the purposes of this discussion, a process can be generally conceived to be a sequence of computer-executed steps leading to a desired result.

These steps usually require physical manipulations of physical quantities. Usually, though not necessarily, these quantities take the form of electrical, magnetic, or optical signals capable of being stored, transferred, combined, compared, or otherwise manipulated. It is convention for those skilled in the art to refer to representations of these signals as bits, bytes, words, information, elements, symbols, characters, numbers, points, data, entries, objects, images, files, or the like. It should be kept in mind, however, that these and similar terms are associated with appropriate physical quantities for computer operations, and that these terms are merely conventional labels applied to physical quantities that exist within and during operation of the computer.

It should also be understood that manipulations within the computer are often referred to in terms such as listing, creating, adding, calculating, comparing, moving, receiving, determining, configuring, identifying, populating, loading, performing, executing, storing etc. that are often associated with manual operations performed by a human operator. The operations described herein can be machine operations performed in conjunction with various input provided by a human operator or user that interacts with the device, wherein one function of the device can be a computer.

In addition, it should be understood that the programs, processes, methods, etc. described herein are not related or limited to any particular computer or apparatus. Rather, various types of general purpose machines may be used with the following process in accordance with the teachings described herein.

The present invention may comprise a computer program or hardware or a combination thereof which embodies the functions described herein and illustrated in the appended flow charts. However, it should be apparent that there could be many different ways of implementing the invention in computer programming or hardware design, and the invention should not be construed as limited to any one set of computer program instructions.

Further, a skilled programmer would be able to write such a computer program or identify the appropriate hardware circuits to implement the disclosed invention without difficulty based on the flow charts and associated description in the application text, for example. Therefore, disclosure of a particular set of program code instructions or detailed hardware devices is not considered necessary for an adequate understanding of how to make and use the invention. The inventive functionality of the claimed computer implemented processes will be explained in more detail in the following description in conjunction with the remaining Figures illustrating other process flows.

Further, certain steps in the processes or process flow described in all of the logic flow diagrams below must naturally precede others for the present invention to function as described. However, the present invention is not limited to the order of the steps described if such order or sequence does not alter the functionality of the present invention. That is, it is recognized that some steps may be performed before, after, or in parallel other steps without departing from the scope and spirit of the present invention.

The processes, operations, and steps performed by the hardware and software described in this document usually include the manipulation of signals by a CPU or remote server and the maintenance of these signals within data structures resident in one or more of the local or remote memory storage devices. Such data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

A key exchange step 211 for key server 102 to derive a secret key X1 211a can utilize a selected set of cryptographic parameters 104a as depicted and described in connection with FIG. 1a and FIG. 2a above. As depicted in FIG. 2b, an key exchange algorithm 220 in step 211 for key server 102 can receive input both of device ephemeral public key Ed 103a and network static private key SK.network 102b. The key exchange algorithm 220 could comprise a Diffie Hellman key exchange (DH), an Elliptic Curve Diffie Hellman key exchange (ECDH), and other possibilities exist as well without departing from the scope of the present invention. A key exchange algorithm 220 can support either PKI keys based on elliptic curves or RSA algorithms, although support of elliptic curves may be preferred in some exemplary embodiments due to their shorter key lengths and lower computational processing requirements.

A summary of ECDH as a key exchange algorithm 220 is included in the Wikipedia article titled "Elliptic Curve Diffie-Hellman" from Mar. 9, 2018, which is herein incorporated by reference. An exemplary embodiment of key exchange algorithm 220 could comprise a "One-Pass Diffie-Hellman. C(1, 1, ECC CDH)" algorithm as described in section 6.2.2.2 on page 81 of the National Institute of Standards and Technology (NIST) document "NIST SP 800-56A. Recommendation for Pair-Wise Key Establishment Schemes Using Discrete Logarithm Cryptography" from March, 2007 which is hereby incorporated by reference its entirety. Other key exchange algorithms in NIST SP 800-56A could be utilized as well for a key exchange algorithm 220 in FIG. 2a and FIG. 2b without departing from the scope of the present disclosure. Example calculations for an ECDH key exchange for a key exchange algorithm 220 are shown below in FIG. 2c.

Other algorithms to derive a secret keys using public keys and private keys may also be utilized in a key exchange algorithm 220, such as, but not limited to, the American National Standards Institute (ANSI) standard X-9.63. Cryptographic parameters 104a can also include information, values, or settings for conducting (i) a key exchange algorithm 220 in step 211 and step 212 and (ii) a key derivation function 216 in order to derive a commonly shared symmetric encryption key K1 216a. As contemplated herein, the terms "selected set of cryptographic parameters 104a" and "cryptographic parameters 104a", and "parameters 104a" can be equivalent, and can also comprise a subset of exemplary cryptographic parameters depicted and described in connection with FIG. 1a and FIG. 2d below. Parameters 104a input into a key exchange algorithm 220 can include a time-to-live for a key K1 216a that is derived, a supported point formats extension, where the supported point formats extension could comprise uncompressed, compressed prime, or "compressed char2" formats, as specified in ANSI X-9.62. In other words, (i) an ECC keys input into a key exchange algorithm 220 and (ii) secret keys output from key exchange algorithm 220 may have several different formats and a set of parameters 104a can be useful to specify the format. As depicted in FIG. 2b, the output of a key exchange algorithm 220 in a step 211, such as an ECDH key exchange, can comprise a secret value X1 211a. In exemplary embodiments, secret value X1 211a can comprise a point on an elliptic curve, where the equation and values for the elliptic curve can be specified in parameters 104a. As contemplated herein, the secret value X1 211a (as well as X2 212a below) comprises both an X coordinate and a Y coordinate, in order to support subsequent ECC point addition operations.

Key exchange step 212 for a sever 101 depicted in FIG. 2a can correspond to key exchange 212 in FIG. 2b. Key exchange step 212 can comprise inputting or using the device ephemeral public key Ed 103a (from message 203 in FIG. 2a) and the server ephemeral private key e1 101b (from a key generation step 101x) into a key exchange algorithm 220, which can comprise the same or equivalent key exchange algorithm 220 depicted and described in connection with key exchange step 211 described above. Other elements or algorithms within a key exchange step 212 can be equivalent to a key exchange step 211 above, including the use of shared parameters 104a. The output of a key exchange algorithm 220 in a step 212 can comprise a secret key or value X2 212a. In exemplary embodiments, secret value X2 212a can comprise a point on an elliptic curve, where the equation and values for the elliptic curve can be specified in parameters 104a. Exemplary numeric values for using a key exchange algorithm 220 are depicted and described below, and key exchange algorithm 220 can utilize an ECC point multiplication of a public key by the scalar value of a private key. In exemplary embodiments, a server 101 can record the value X2 212a derived from a step 212 and also the value X1 211a received in a message 206b in a server database 101d. The time the values are stored in a server database 101d can be minimized in order to increase security, and, for example, the recording of the values can be deleted before server 101 sends the "OK" message 210b to key server 102 in FIG. 2a.

A key derivation step 213 for server 101 can (i) combine the output of key exchange steps 211 and 212 in order to calculate or derived the shared secret X3 215 and then (ii) perform a key derivation function step 216 on the derived or calculated shared secret X3 215 in order to determine or calculate shared secret key K1 216a, which can comprise a symmetric ciphering key. Note that shared secret key K1 216a can be also mutually derived by device 103, where device 103 uses the key exchange step 218 depicted and described in connection with FIG. 2c below. In exemplary embodiments, a server 101 can conduct the key derivation step 213 using (i) the value X1 211a received from key server 102 (where receipt of X1 211a by server 101 can be in a message 206b as shown in FIG. 2a above), and (ii) the value or key X2 212a output from a key exchange step 212 for server 101 in the paragraph above. As contemplated herein, the values of X1 211a, X2 212a, and X3 215 may be described as either "shared secrets" or "shared secret keys". Although the values may not normally be used as a key directly with a symmetric ciphering algorithm, these values and the output of a key exchange algorithm 220 can comprise a secret or a key.

Key derivation step 213 for server 101 can comprise two primary steps. A first step in key derivation 213 can comprise an ECC point addition 214 on the value X1 211a and the value X2 212a. The result of the ECC point addition will be equal to the value X3 215. Note that device 103 can also derive the same value for value X3 215 (in step 218 below) without ECC point addition 214 using a step 218. In other words, although (a) the related key exchange step 218 for device 103 may include a point addition for public keys, (b) the key exchange step 218 for device 103 will not use ECC point addition for points derived from two separate private keys in two separate servers (e.g. X1 211a uses private key SK.network 102b and X2 212a uses private key e1 101b).

Exemplary calculations for an ECC point addition 214 can comprise the calculations shown for point addition in the Wikipedia article for "Elliptic Curve Point Multiplication" dated May 15, 2018, which is herein incorporated by reference in its entirety. As depicted in FIG. 2b, (a) the calculation of X3 215 by server 101 using an ECC point addition 214 over X1 211a and X2 212a will equal (b) the value for X3 215 calculated by device 103 using a key exchange algorithm 220 in a step 218 from FIG. 2c below. A second step in key derivation step 213 as depicted in FIG. 2b can comprise a key derivation function step 216 using (a) input from ECC point addition step 214 (e.g. value X3 215 output from step 214), where (b) the output of key derivation function step 216 can comprise key K1 216a and also an associated MAC key 216b. In exemplary embodiments, the X coordinate from shared secret X3 215 can be used with key derivation function 216.

By server 101 conducting a key derivation step 213 as depicted in FIG. 2b (where key server 102 conducts the calculations for step 211 using the network static private key SK.network 102b), (i) sever 101 can calculate symmetric ciphering key K1 216a without recording or operating on the network static private key SK.network 102*b*. In this manner, the security of a system 100 or system 200 can be significantly enhanced, since the network static private key 102*b* does not need to be recorded or operated by server 101, which can communicate with a plurality of devices 103 over an IP network. In other words, by server 101 (*i*) using the ECC point addition over key X1 211*a* instead of (ii) conducting a key exchange 220 directly with SK.network 102*b*, then server 101 does not need to record or operate with the network static private key SK.network 102*b*, thereby increasing security. Also, since (i) key X1 211*a* can be the equivalent of an ECC public key as a point on an elliptic curve, and (ii) it is not computationally feasible to determine network static private key SK.network 102*b* from key X1 211*a*, then key X1 211*a* does not reveal meaningful information about network static private key SK.network 102*b*.

Many benefits can be achieved by server 101 conducting a key derivation step 213 using key X1 211*a* instead of recording and operating with network static private key SK.network 102*b*. As one example, the corresponding network static public key PK.network 102*a* could potentially be both (i) recorded in millions of distributed devices connecting to server 101 through many different physical locations and networks, and (ii) used for a decade or longer. Keeping network static private key SK.network 102*b* secure for this embodiment could be economically essential, since a compromise of network static private key SK.network 102*b* may (i) render the devices 103 insecure (or unable to authenticate network 105 using an ECDHE key exchange), and (ii) require the secure distribution or re-installation of a new, different network static public key SK.network 102*a* in the devices, which may not be economically feasible due to the prior distribution of devices.

Exemplary data and numbers can be provided to demonstrate the calculations for (i) key exchange step 211, (ii) key exchange step 212, and (iii) key derivation step 213 using an ECC point addition 214. The exemplary data can comprise decimal numbers for the example ECC PKI keys and exchanged keys listed in "Test vectors for DPP Authentication using P-256 for mutual authentication" on pages 88 and 89 of the DPP specification version 1.0. Parameters 104*a* can comprise the elliptic curve of "secp256r1" with key lengths of 256 bit long keys.

The network static private key SK.network 102*b* can comprise the exemplary following number, and can be recorded in key server 102:
 38358416135251014160802731750427376395128366 42345557454525003523673959390812 8

The server ephemeral private key e1 101*b* can comprise the exemplary following number, and can be recorded by server 101:
 111991471310604289774359152687306247761778388 60576455984886915471298010882730 1

The device ephemeral public key Ed 103*a* can comprise the following exemplary values with X and Y numbers (or "coordinates") of:
 X: 61831688504923817367484272103056848457 7 216011069879115485152191196611409919 66
 Y: 43682127411605262630763685096978902757 3 720854595612820926922498255090826944

Key exchange step 211 for an ECDH algorithm key exchange 220 by key server 102 can input the device ephemeral public key Ed 103*a* and the network static private key SK.network 102*b* (both with numbers above) in order to calculate a secret X1 211*a*. An exemplary number or value for secret X1 211*a* from the values above using parameters 104*a* can be:

X: 11490047198680522515311590962599671482 0 29417064351337303313906642805743573119
Y: 27933966560238204731245097943399084523 80948183343475440972360497036608202185 5

Key exchange step 212 for an ECDH algorithm key exchange 220 by server 101 can input the device ephemeral public key Ed 103*a* and the server ephemeral private key e1 101*b* (both with numbers above) in order to calculate a secret X2 212*a*. An exemplary number or value for key X2 212*a* from the values above using parameters 104*a* can be:
 X: 78944719651774206698250588701582570633 5 03182903415394243006529481189158194650
 Y: 11227712702924684581834935828837489140 2 01820424536062912051086382324589445237

An ECC point addition 213 for the above two derived points (or "keys") X1 211*a* (from keys Ed 103*a* and SK.network 102*b*) and X2 212*a* (from keys Ed 103*a* and e1 101*b*) will result in the following point that also equals X3 215.
 X: 11373450062906554555789352406461011374 08 58966831672649615565042035695230713090
 Y: 68961429691307429166796760881095689348 0 88875771334970644593306388375741965262

Note that the same numeric value for key X3 215 can also be derived by device 103 from a key exchange step 218 below using ECDH key exchange algorithm 220*a*. For exemplary embodiments, although private key SK.network 102*b* and ephemeral private key e1 101*b* are recorded and operated by physically separated devices, device 101 can record and operate on the corresponding public keys PK.network 102*a* and ephemeral public key E1 101*a* (at the same physical location as device 103).

After an ECC point addition 213, for a key derivation step 218 in FIG. 2*b*, server 101 can input the shared secret key X3 215, where key X3 215 was output from the ECC point addition 214, into a key derivation function 216. The key derivation function 216 can comprise the same key derivation function 216 used by a device 103 in a step 218 below. The output of a key derivation function 216 can comprise both (i) a symmetric ciphering key K1 216*a* and (ii) a MAC key 216*b*. MAC key 216*b* can be used with a symmetric ciphering algorithm in order to generate a MAC code, such that the other party using the same key K1 216*a* and MAC key 216*b* can process the ciphertext and calculate the same MAC code in order to verify message integrity.

Key derivation function 216 can use a secure hash function such as, but not limited to, SHA-256, SHA-384, SHA-3, etc, and additional values such as a text string with secret X3 215. The specification of a secure hash algorithm and the text string for use with a key derivation function 216 could be commonly shared between server 101 and device 103 by commonly shared parameters 104*a*. In some exemplary embodiments, the text string for use with secret X3 215 can be from data, text, or values transmitted in (i) message 203 (for KDF 216 by server 101 in step 213) and/or (ii) message 206*c* (for KDF 216 by device 103 in step 218). The output of a secure hash algorithm within a key derivation function 216 could have a subset of bits selected or possibly a secure hash expanded in order to obtain the number of bits required for a symmetric key with a symmetric ciphering algorithm, such as key K1 216*a*. A key derivation function (KDF) 216 could comprise a KDF compatible with or specified by ANSI standards for "X9.63 Key Derivation Function". Other possibilities exist for a key derivation function 216 to convert a secret X3 215 into a symmetric ciphering key K1 216*a* and a MAC key 216*b* without departing from the scope of the present disclosure. As contemplated in the present disclosure, although an ECC public key such as secret X3 215 can comprise a coordinate with an X value and a Y value, in exemplary embodiments a single number comprising the X value can be selected and input into a key derivation function 216. In addition, the key K1 216a can comprise two portions, where (i) a first portion can be a key for encrypting data by server 101 and decrypting the data by device 103 and (ii) a second portion can be a key for encrypting data by device 102 and decrypting the data by server 101.

FIG. 2c

Figure 2C:
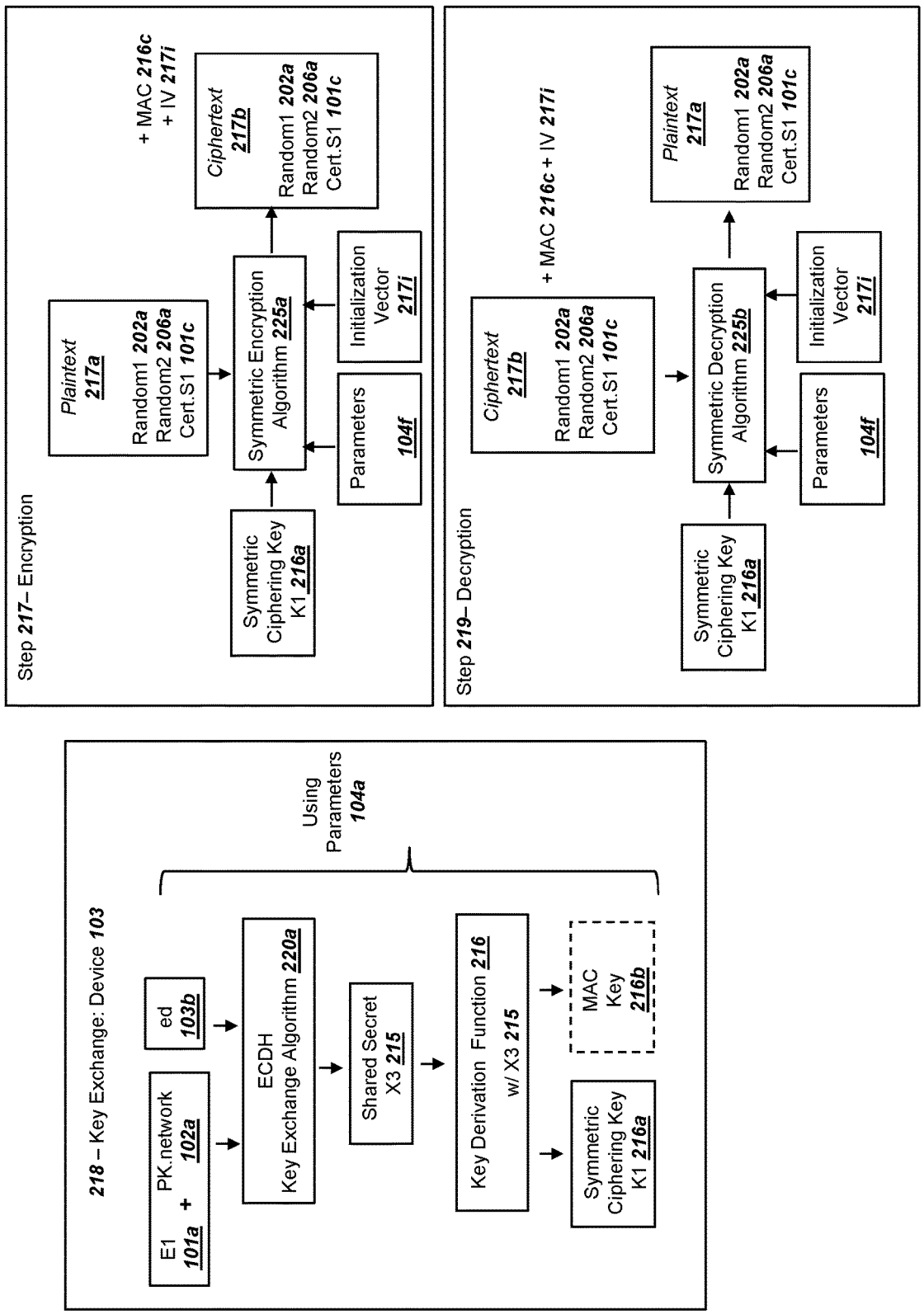
FIG. 2c is a flow chart illustrating exemplary steps for conducting a key exchange using PKI keys in order to derive a shared secret key, and for using the derived shared secret key to encrypt and decrypt data, in accordance with exemplary embodiments.

FIG. 2c is a flow chart illustrating exemplary steps for conducting a key exchange using PKI keys in order to derive a shared secret key, and for using the derived shared secret key to encrypt and decrypt data, in accordance with exemplary embodiments. Exemplary steps for a device 103 to mutually derive a shared secret X3 215 and symmetric key 216a can comprise a key exchange step 218. Exemplary steps in FIG. 2c for a server 101 to encrypt plaintext data using the mutually derived symmetric key 216a can comprise an encryption step 217. Exemplary steps in FIG. 2c for a device 103 to decrypt ciphertext data using the mutually derived symmetric key 216a can comprise a decryption step 219. The use of the steps for a key exchange 218, encryption 217, and decryption 219 were also depicted and described in connection with FIG. 2a above. Note that steps in FIG. 2c and the steps in FIG. 2b can share some algorithms and values, and the descriptions for the algorithms and values in FIG. 2ab can be applicable for FIG. 2c. For example, the key exchange algorithm 220a can comprise an ECDH key exchange equivalent to key exchange step 220. The set of parameters 104a depicted and described in FIG. 2b can also be used in FIG. 2c.

A device 103 can conduct a key exchange step 218. At step 218, (i) a combination of a recorded network static public key PK.network 102a and received server ephemeral public key E1 101a, and (ii) the derived device ephemeral private key ed 103b can be input into an ECDH key exchange algorithm 220a in order to calculate the shared secret X3 215. The recorded network static public key PK.network 102a and received server ephemeral public key E1 101a can be combined via elliptic curve point addition. Exemplary data and numbers can be provided to demonstrate the calculations for (i) key exchange step 218. The exemplary data can comprise decimal numbers for the example ECC PKI keys and exchanged keys listed in "Test vectors for DPP Authentication using P-256 for mutual authentication" on pages 88 and 89 of the DPP specification version 1.0. Parameters 104a can comprise the elliptic of "secp256r1" with key lengths of 256 bit long keys.

The device ephemeral private key ed 103b can comprise the exemplary following number, and can be recorded in device 103 after a key pair generation step 103x from FIG. 1a above: 981422971824451855355095869206102482 948028127945079308616768474714564200 4923

The network static public key PK.network 102a can comprise the exemplary values with X and Y numbers (or "coordinates") of:
X: 44198070003813586561115061476516229802700 29110554119329493335953912822452287
Y 37427159939572325965354914097696269740713 866333885143374269952770772578794844

The server ephemeral public key E1 101a can comprise the following exemplary values with X and Y numbers (or "coordinates") of:
X: 42629956901026513598149966301519681371972 968598637962756879877886841583606416
Y: 20486612594265388212565154850034967164732 043090221075006612427172869133074917

An ECC point addition for the above two keys E1 101a and PK.network 102a will result in the following exemplary point, which comprises (a) both E1 101a and PK.network 102a for a key exchange step 218 then (b) input into an ECDH key exchange algorithm 220a:
X: 28114613657326475531346375416853531696489 05058941523144737599092152119800180
Y: 93903335977032690345879985966890561591 04867525610115796483402553958768796 8435

The above combination of both E1 101a and PK.network 102a for a key exchange step 218 via an ECC point addition operation is depicted in FIG. 2c with the "+" symbol between the public keys.

The output of the above ECC point addition for public keys E1 101a and PK.network 102a can be input into ECDH key exchange algorithm 220a using parameters 104a. All of the exemplary calculations for a key exchange step 218 can use the exemplary subset of cryptographic parameters 104a. An ECDH algorithm key exchange 220a in key exchange step 218 can input (i) the exemplary point immediately above from the ECC point addition operation on the public keys 101a and 102a and (ii) the device ephemeral private key ed 103b into the ECDH key exchange 220a, and output the point X3 215. Note that the secret X3 215 as derived by device 103 in a key exchange step 218 equals or is the same numeric value as the secret X3 215 derived by server 101 in a key derivation step 213 in FIG. 2b. An exemplary number or value for secret X3 215 calculated by device 103 using a key exchange step 218 using the above exemplary numeric values for ed 103b, PK.network 102a, and E1 101a would be:
X: 11373450062906554555789352406461011374 0858966831672649615565042035695230713090
Y: 68961429691307429166796760881095689348 08887577133497064459330638837574196 5262

Although FIG. 2c depicts an ECC point addition operation over public keys E1 101a and PK.network 102a, the same shared secret value X3 215 could be generated or derived by conducting (i) a first ECC point multiplication operation with the server ephemeral public key E1 101a and the device ephemeral private key ed 103b to derive a first point, and (ii) a second ECC point multiplication operation with the network ephemeral public key PK.network 102a and the device ephemeral private key ed 103b to derive a second point, and (iii) an ECC point addition operation with the first point and the second point to derive the shared secret value X3 215. In other words, the value X3 215 can be calculated as either:

$$X3215=[E1101a+PK.\text{network }102a]*ed\ 103b, \text{ or} \quad (i)$$

$$X3215=[E1101a*ed103b]+[PK.\text{network}102a*ed103b] \quad (ii)$$

For a key derivation step 218, derived shared secret key X3 215 can be input into a key derivation function 216 where the key derivation function 216 can be equivalent to the key derivation function 216 depicted and described in connection with FIG. 2b above for a key derivation step 213. Note that for key derivation steps in the present disclosure, the X coordinate of a derived shared secret can be taken or used as input into the key derivation function. The output of a key derivation function 216 can comprise both (i) a symmetric ciphering key K1 216a and (ii) a MAC key 216b. MAC key 216b can be used with a symmetric ciphering algorithm in order to generate a MAC code, such that the other party using the same key K1 216a and MAC key 216b can process the ciphertext and calculate the same MAC code in order to verify message integrity. The use of key K1 216a and MAC key 216b are described in connection with encryption step 217 and decryption step 219.

Server 101 can conduct an encryption step 217, where the use for an encryption step 217 is depicted and described in connection with FIG. 2a above. Plaintext 217a in a step 217 can comprise the first random number random1 202a from device 103, the second random number random2 205r, and the server certificate cert.server 101c. Other or different exemplary data could be included as plaintext 217a in an encryption step 217, including extensions for a TLS or DLTS handshake. The symmetric ciphering key for encryption step 217 can comprise symmetric key K1 216a from a key derivation step 213 and a MAC key 216b can be input into a symmetric ciphering algorithm 225 as well. Encryption step 217 and decryption step 219 can use a common symmetric ciphering algorithm 225, which could comprise the Advanced Encryption Standard with Synthetic Initialization Vectors (AES-SIV) (and deciphering algorithm) also with a common set of symmetric ciphering parameters 104f from a set of cryptographic parameters 104. Other or different symmetric ciphering algorithms 225 could be utilized as well, such as, but not limited to such as AES. Triple Data Encryption Standard (3DES). Blowfish, or related algorithms. A mutually derived symmetric ciphering key K1 216a can comprise two portions, where a first portion is used by server 101 for encryption and a second portion is used by device 103 for encryption. At least the first portion of key K1 216a can be used in an encryption step 217.

Symmetric ciphering parameters 104f can also specify the use of a block chaining mode such as cipher block chaining (CBC), counter mode (CTR), or Galois/Counter mode (GCM) and other possibilities exist as well. In addition, symmetric ciphering parameters 104f could specify a mode for message authentication, which could comprise a CMAC mode as specified in NIST publication SP-800-38B. In some exemplary embodiments, a symmetric ciphering algorithm 225 can comprise the AES-SIV algorithm as specified in IETF RFC 5297. The output from an encryption step 217 using a symmetric ciphering algorithm 225 and the depicted values input can be ciphertext 217b, as depicted in FIG. 2c.

A decryption step 219 can be performed by device 103. A decryption 219 step converts the ciphertext 217b received in a message 206c from FIG. 2a into plaintext 217a. Decryption step 219 can utilize a symmetric decryption algorithm 225, which could comprise the same algorithm used in symmetric encryption algorithm 225 except the algorithm being used for decryption instead of encryption. Note that the same values are input into symmetric decryption algorithm 225 as symmetric encryption algorithm 225 above, such as symmetric encryption key K1 216a (or the first portion of key K1 216a if a second portion of key K1 216a is used by device 103 for encryption) and parameters 104f in order to convert ciphertext 217b back into plaintext 217a. Additional data input into symmetric decryption algorithm 211b can comprise an initialization vector 217i and MAC code 216c which could be sent along with ciphertext 217b.

Device 103 can the read and process plaintext 217a after a decryption 219 step. The plaintext 217a as read by device 103 can comprise the first random number random1 202a from device 103, the second random number random2 205r, and the server certificate cert, server 101c. In exemplary embodiments, the successful decryption of a ciphertext into a plaintext using decryption algorithm 225 supports one-way authentication of the server 101 and/or network 105, since successful decryption by device 103 can only take place when the server 101 has access to network static private key SK.network 102b. In other words, only the nodes could mutually derive key K1 216a in FIG. 2b and FIG. 2c by (i) device 103 recording PK.network 102a and (ii) server 101 having access to SK.network 102b (via key server 102). Thus, data that is successfully encrypted by the server 101 and decrypted by the device 103 using key K1 216a would confirm the server 101 is authenticated. As depicted and described in connection with FIG. 2a, server 101 or device 103 can also conduct both an encryption step 217 and a decryption step 219. The steps for server 101 to conduct a decryption step 219 for can comprise step 219a as depicted and described in FIG. 2a. When server 101 conducts decryption step 219a using symmetric encryption key K1 216a, the ciphertext and plaintext will comprise different values than those depicted in FIG. 2c, where the ciphertext for a decryption step 219a can comprise ciphertext2 217d. Further, a device 103 can conduct an encryption step 217c in with key K1 216a in order to create ciphertext 217d, as depicted in FIG. 2a.

FIG. 2d

FIG. 2d is an illustration of an exemplary server database and an exemplary set of cryptographic parameters, in accordance with exemplary embodiments. A server database 101d depicted and described above in connection with system 100 and system 200 can record data for server 101 to work with a plurality of devices 103 and at least one key server 102. A server database 101d could record in at least one set of values, keys, and/or numbers for a plurality of devices 103. Other possibilities exist as well for the organization, tables, and recorded data within a server database 101d without departing from the scope of the present disclosure. Data within server database 101d could be encrypted using a symmetric key. Although system 100 and system 200 depict a server database 101d as operating or recorded within a server 101, a server database 101d could comprise a separate server within a network 105 and communicating with server 101 via a secure session 221 or a private network 107a. Further, a server database 101d, when operating or recorded in a separate server than server 101, then server database 101d could contain electrical components equivalent to a server 101 depicted and described in connection with FIG. 1b.

Server database 101d can record values or numbers for a first random number random1 202a, received device ephemeral public key Ed 103a, a selected set of cryptographic parameters 104a, a source IP address and port number 203a received for message 203, a secure hash value over PK.network 102a comprising H(PK.network 102a) 250, and identity for key server 102 comprising ID.key-server 102i, an ECC point value X1 211a, a server ephemeral public key E1 101a, a server ephemeral private key e1 101b, an ECC point value X2 212a, an ECC point value X3 215, a derived symmetric ciphering key K1 216a, and a second random number random2 205r. In exemplary embodiments, the values depicted in the first row of server database 101d could comprise data recorded by a server 101 while conducting the series of steps for a step 222 and step 223 depicted and described in connection with FIG. 2a above with a first device 103. The values depicted in the second row of server database 101d could comprise data recorded by a server 101 while conducting the series of steps for a step 222 and step 223 depicted and described in connection with FIG. 2a above with a second device 103, etc.

In exemplary embodiments for a server database 101d, a first device 103 could send server 101 a first value for device ephemeral public key Ed 103a, and the first value is depicted in FIG. 2d as "103a-1". Since server 101 could communicate with a plurality of devices 103, the second row in the depicted server database 101d could comprise data for the equivalent steps conducted with a second device 103, such as recording a second value for device ephemeral public key Ed 103a for the second device. The second value for device ephemeral public key Ed 103a with the second device 103 is depicted in FIG. 2d as "103a-2". Equivalent notations for other keys or values are applicable as well, such as server database 101d recording a first secret X1 211a depicted as "211a-1" for a first device 103, and then recording a second secret X1 211a depicted as "211a-2". Thus, as depicted a server database 101d can record and operate with a plurality of different values for a key, where each are utilized by a different device. Although not depicted in FIG. 2d, a server database could record device identity ID.device 103i as well. For embodiments where a device identity 103i is not available, then server 101 could keep track of different devices 103 for conducting the steps in FIG. 2a by the source IP:port number 203a.

In some exemplary embodiments, a message 203 can include a secure hash value H(PK.network 102a) 250, as described for a message 203 in FIG. 2a above. The receipt of a secure hash value H(PK.network 102a) 250 could be mapped to or associated with a key server 102 via a key server identity ID.key-server 102i, where the mapping of H 250 to ID.key-server 102i could be recorded in a server database 101d before device 103 sends a message 203. For these embodiments and after receipt of message 203, server 101 could conduct a query of server database 101d using the received H 250 in a message 203 in order to select a key server 102 with ID.key-server 102i in order to send the message 206a to key server 102. In this manner, server 101 can communicate with a plurality of different key servers 102, and the destination of a message 206a (or key server 102) can be selected by the value H 250 received in a message 203. In other words, for a plurality of different devices 103 communicating with a server 101, a first subset of devices 103 could record and use a first network static public key PK.network 102a, and a second subset of devices 103 could record and use a second network static public key PK.network 102a. By receiving a value or identifier of the first or second key 102a in message 203 (such as H(PK.network 102a) 250), server 101 could use the data depicted for a server database 101d to select or identify the correct key server 102 in order to (i) send a message 206a and (ii) receive the correct secret X1 211a for the device 103 using a particular PK.network 102a.

Although the value H(PK.network 102a) 250 is depicted as recorded in a server database 101d in FIG. 2d, a different value or identifier for the PK.network 102a could be recorded and utilized as well. In an exemplary embodiment, server 101 could receive the plaintext PK.network 102a in a message 203 and record the plaintext PK.network 102a in a server database 101d (instead of a hash value H 250). In another exemplary embodiment, an identity for key server 102 (such as ID.key-server 102i) could be selected or determined by server 101 using the selected set of cryptographic parameters 104a received in message 203 and recorded in a database 101d. For these embodiments, a first selected set of cryptographic parameters 104a could be associated with a first key server 102 (and first ID.key-server 102i) and a second set of cryptographic parameters 104a could be associated with a second key server 102 (and second ID.key-server 102i). Other possibilities exist as well for a server database 101d to record data in order to select a key server 102 for sending message 206a with device ephemeral public key Ed 103a based on data received in message 203, without departing from the scope of the present disclosure. As one example, the identity for key server 102 of ID.key-server 102i could be included in message 203 and the value for ID.key-server 102i could be recorded in a server database 101d by server 101.

In a server database 101d, although separate values are depicted for some data, such as values "102i-1" and "102i-2" for identities of key servers 102, some of the exemplary values can comprise identical strings or numbers. For example, data for two different devices 103 in a server database 101d could record the same name or value of "102i-2" for a single key server 102 to be associated with the two different devices 103. Likewise, two different devices 103 could share the same network static public key PK.network 102a, and thus H 250 can be the same value of an exemplary "250-2" for two different devices 103. A server database 101d could also record additional data and values than those depicted in FIG. 2d for some exemplary embodiments. For example, server database 101d could record timestamps for when messages are transmitted or received, such that stale or data older than a specified range could be purged. Server database 101d could also record data received from device 103 in a message 210a, which could include data from a transducer operated by device 103.

Some data within a server database 101d could be recorded and operated on separately by server 101, such as server 101 not recording secrets such as X1 211a or X2 212a, etc, in a database 101d, but rather server 101 could record the values in volatile memory 101f of server 101. In exemplary embodiments, server database 101d could also operate in a distributed or "cloud" configurations such that multiple different servers 101 could query and record data in server database 101d, where data for server database 101d is recorded in multiple, physically separated servers.

Cryptographic parameters 104 can specify sets of cryptographic parameters that are supported by server 101 in order to process message 203 and send response message 206c from FIG. 2a. Cryptographic parameters 104 can be recorded in a server database 101d, or in other locations within a system 100 and system 200. As depicted in FIG. 1a, each of device 103, server 101, and key server 102 can record and operate with a set of cryptographic parameters 104. Cryptographic parameters 104 can record a collection of cryptographic algorithms or specifications such as a set identifier 104a, a key length 104b, an ECC curve name 104c, a hash algorithm 104d, symmetric ciphering key length 104e, settings for a symmetric ciphering algorithm 104f, and a random number length 104g.

As contemplated herein, when a selected set of cryptographic parameters such as using the words or description "parameters 104a" or "cryptographic parameters 104a" can specify a row of parameters or values in a set of cryptographic parameters 104, such that the collection of values in the row can be used with key pair generation functions 101x and 103x, ECDH key exchange 220, and other cryptographic operations and steps as contemplated herein. Set identifier 104a can be an identity for a row or set of values for cryptographic parameters 104. For example, set "A" can comprise cryptographic suite 1 as specified in section 3.2.3 of DPP specification version 1.0. Key length 104b can be the length of keys in bits for PKI keys used in system 100 and system 200. ECC Curve name 104c can be a name for an ECC curve used with PKI keys and key exchange algorithms in system 100 and system 200.

Hash algorithm 104d in cryptographic parameters 104 can be the name of a secure hash algorithm, such as the exemplary SHA-256 algorithm depicted, which may also be referred to as "SHA-2". Hash algorithm 104d can also be used in a key derivation function (e.g. KDF 216 above in FIG. 2*b* and FIG. 2*c*) and also with digital signature steps 207*a* and 209*a*. Settings for a symmetric ciphering algorithm 104*f* can specify the identity or name of a symmetric ciphering algorithm 225 such as "AES", "AES-SIV", 3DES, Blowfish, etc. Random length 104*g* can specify the length in bits for random numbers or "nonces" generated by both device 103 and server 101, where the nonces can be used to prevent replay attacks and require messages transmitted and received to be unique. Other possibilities exist as well for data within cryptographic parameters 104, such as the specification of point compression, encoding rules such as distinguished encoding rules (DER), ASN or CSN syntax notation, padding rules, etc.

FIG. 2*e*

Figure 2E:
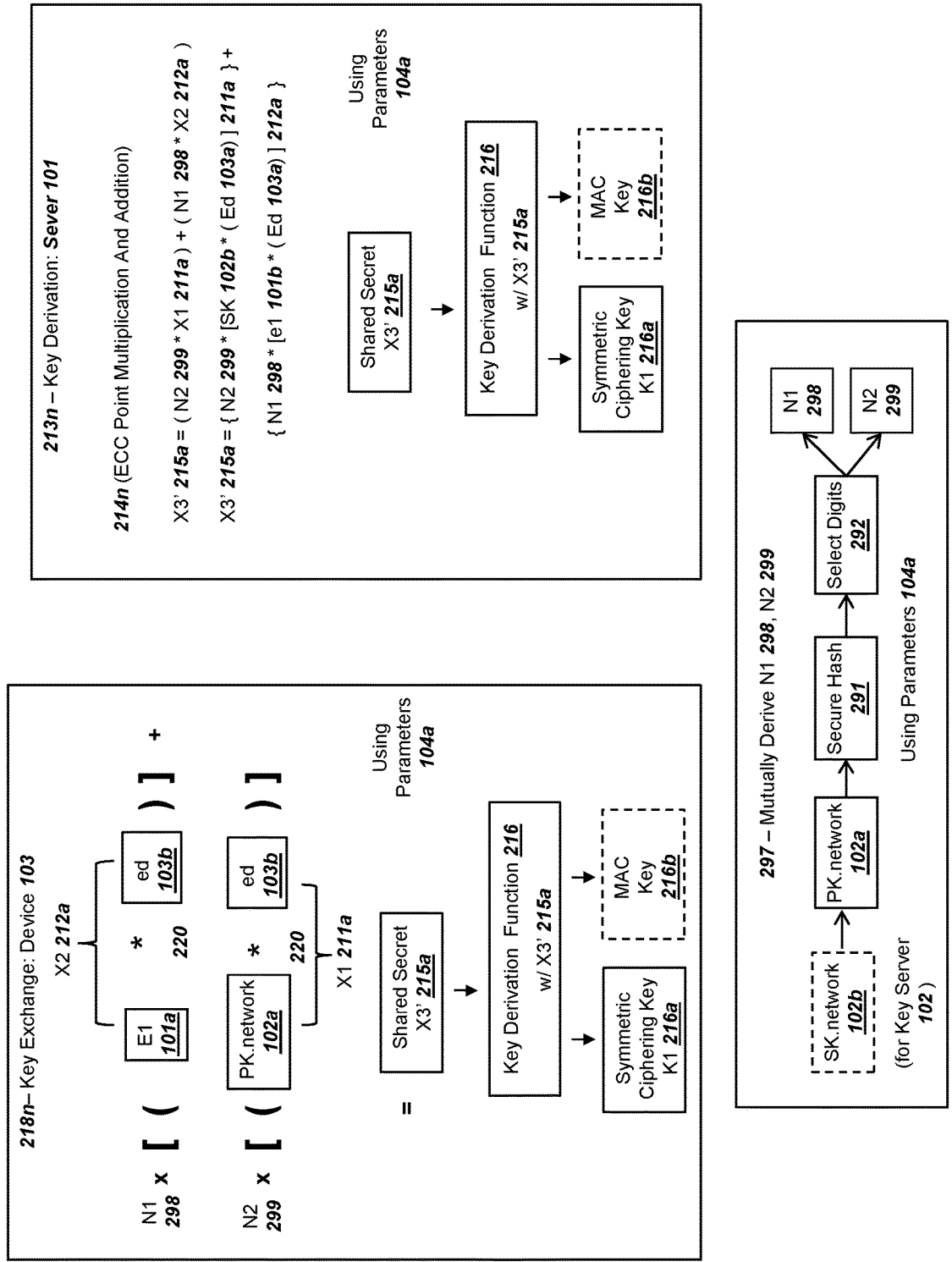
FIG. 2e is a flow chart illustrating exemplary steps for conducting a key exchange using PKI keys in order to derive a shared secret key using ECC point multiplication, in accordance with exemplary embodiments.

FIG. 2*e* is a flow chart illustrating exemplary steps for conducting a key exchange using PKI keys in order to derive a shared secret key using ECC point multiplication, in accordance with exemplary embodiments. An ECDH key exchange step 218*n* can be conducted by a device 103, and use the steps for an ECDH key exchange step 218, with the additional steps of conducting an ECC point multiplication using numbers N1 298 and N2 299. A key derivation step 213*n* can be conducted by a server 101, and use the steps for a key derivation step 213, with the additional steps of conducting an ECC point multiplication using the same numbers N1 298 and N2 299. In other words, (i) ECDH key exchange step 218 can comprise the depicted ECDH key exchange step 218*n* where the numbers for N1 298 and N2 299 are equal to the value of "1", and (ii) key derivation step 213 can comprise the depicted key derivation step 213*n* where the numbers for N1 298 and N2 299 are also equal to the value of "1". In some exemplary embodiments, (i) an ECDH key exchange step 218 depicted and described in connection with FIG. 2*a* for device 103 can comprise the ECDH key exchange step 218*n* with point multiplication, and key derivation step 213 for server 101 can comprise the key derivation step 213*n* with point multiplication. The set of parameters 104*a* from figures above, such as with FIG. 2*a*, can be used with both ECDH key exchange step 218*n* and key derivation step 213*n*.

A device 103 can conduct a key exchange step 218*n*. At step 218*n*, a device 103 can conduct a first ECDH key exchange step 220 and a second ECDH key exchange step 220. For a step 218*n*, a first ECDH key exchange step 220 can be conducted by device 103 with (i) the server ephemeral public key E1 101*a* received in a message 206*c* from FIG. 2*a* and (ii) the recorded device ephemeral private key ed 103*b*, and the resulting point multiplied by the number N1 298. Note that the ECC point resulting from the first ECDH key exchange 220 in the previous sentence will also equal the point X2 212*a* multiplied by the number N1 298, where the calculation of point X2 212*a* is depicted and described in connection with a key exchange step 212 in FIG. 2*b*.

Continuing with step 218*n*, a device 103 can conduct the second ECDH key exchange step 220 with (i) the network static public key PK.network 102*a* recorded in device 103 and (ii) the recorded device ephemeral private key ed 103*b*, and the resulting point multiplied by the number N2 299. Note that the ECC point resulting from the second ECDH key exchange 220 in the previous sentence will also be equal to the point X1 211*a* multiplied by the number N2 299, where the calculation of point X1 211*a* is depicted and described in connection with key exchange step 211 in FIG. 2*b*.

Continuing with step 218*n*, a device 103 can conduct an ECC point addition operation on the two points resulting from (i) the first ECDH key exchange step 220 multiplied by N1 298 and (ii) the second ECDH key exchange step multiplied by N2 299. In other words, a device 103 can conduct an ECDH point addition operation with (i) the value X2 212*a* multiplied by N1 298 and (ii) the value X1 211*a* multiplied by the value N2 299, in order to derive a secret X3' 215*a* that is mutually shared with server 101.

Exemplary data and numbers can be provided to demonstrate the calculations for (i) key exchange step 218*n* and (ii) key derivation step 213*n*. The exemplary data can comprise decimal numbers for the example ECC PKI keys and exchanged keys described above in FIG. 2*b*. The first ECDH key exchange 220 for device 103 using (i) the exemplary numerical value for device ephemeral private key ed 103*b* in FIG. 2*c* and (ii) the exemplary numerical value for server ephemeral public key E1 101*a* in FIG. 2*c*, using parameters 104*a*, will result in the exemplary number or value for secret X1 211*a*, where parameters 104*a* can comprise the elliptic curve of "secp256r1" with key lengths of 256 bit long keys:

X: 11490047198680522515311590962599671482 02941706435133730331390664280574373119
Y: 27933966560238204731245097943399084523 80948183343475440972360497036608202185 5

For an exemplary value of "3" for N1 298, the resulting ECC point multiplication of X1 211*a* by N1 298 with the value of "3" will result in the following point "3×X1":

X: 60742753813277956134086722801387134015 74923364922888423618765165381417622553 6
Y: 58611335288463132268275870174894337145 88878686344135068370844317692632829896 9

The second ECDH key exchange 220 for device 103 in a step 218*n* using (i) the exemplary numerical value for device ephemeral private key ed 103*b* in FIG. 2*c* and (ii) the exemplary numerical value for network static public key PK.network 102*a* in FIG. 2*c*, using parameters 104*a*, will result in the exemplary number or value for secret X2 212*a*:

X: 78944719651774206698250588701582570633 50318290341539424300652948118915819465 0
Y: 11227712702924684581834935828837489140 20182042453606291205108638232458944523 7

For an exemplary value of "7" for N2 299, the resulting ECC point multiplication of X2 212*a* by N2 299 with the value of "7" will result in the following point "7×X2":

X: 97872096638582215727304642389226702208 5 75594850473136075994007337240867556563
Y: 30901113762050629628611789412759390525 6 16003079040872429940997779854500728255

An ECC point addition for the two points "3×X1" and "7×X2" will result in the following point, which can equal the shared secret X3' 215*a* for a key exchange step 218*n*:

X: 10746030868662111168490079561969587470 11 3225877638812168829795832581341050774 8
Y: 10479703991264491981099885351236043493 03 3686741382017165496514798694755489900

The above values for N1 298 and N2 299 are exemplary, and any numeric value less than the large prime number p for a named elliptic curve could be selected for both N1 298 and N2 299.

Continuing with step 218*n*, derived shared secret key X3' 215*a* can be input into a key derivation function 216 where the key derivation function 216 can be equivalent to the key derivation function 216 depicted and described in connection with FIG. 2*b* above for a key derivation step 213. Note that for key derivation steps in the present disclosure, the X coordinate of a derived public key can be taken or used as input into the key derivation function. The output of a key derivation function 216 can comprise both (i) a symmetric ciphering key K1 216a and (ii) a MAC key 216b. The use of key K1 216a and MAC key 216b are described in connection with encryption step 217 and decryption step 219 in FIG. 2c.

For a key derivation step 213n by server 101, server 101 can conduct the equivalent steps as key derivation step 213 in FIG. 2b, with point multiplication operations depicted in FIG. 2e. Server 101 can perform an ECC point addition and point multiplication step 214a using the values X1 211a and X2 212a, as well as the numbers N1 298 and N2 299. The value X1 211a could be received by server 101 from key server 102 in message 206a. Note that the value X1 211a is derived by key server 102 using an ECDH key exchange step 211 as depicted and described in connection with FIG. 2b. A server 101 could calculate the value for X2 212a using an ECDH key exchange step 212 in FIG. 2b. The value or point X1 211a can be multiplied by number N2 299. The value or point X2 212a can be multiplied by the number N1 298. An ECC point addition can be performed on the two ECC points obtained in each of the previous two sentences in order to calculate a value X3' 215a. The exemplary calculations for point multiplication on X1 211a (with N2 299) and X2 212a (with N2 298) by device 103 would also be calculated by server 101. In other words, the exemplary data and numbers depicted above for the calculations by device 103 could also be calculated by server 101 in order to mutually derive the same value for X3' 215a. The mutually derived value for X3' 215a can be input into key derivation function 216 in order to calculate a symmetric ciphering key K1 216a and a MAC key 216b, which can comprise the same numbers as calculated by device 103 in a step 218n.

The source of values for N1 298 and N2 299 for both device 103 and server 101 could be mutually obtained in several ways. N1 298 and N2 299 could be recorded and shared with a set of cryptographic parameters 104, such that selecting a subset of the cryptographic parameters 104a could determine the values or numbers to use for N1 298 and N2 299. In another exemplary embodiment. N1 298 and/or N2 299 could comprise pre-shared secret values or keys, such that device 103 receives the values in a secure manner before sending message 203, such as, but not limited to, recording the values at functionally the same time network static public key PK.network 102a is recorded in device 103. Server 101 could receive the values N1 298 and N2 299 in a secure manner, such as from key server 102 in a secure session 221. Other possibilities exist as well for a device 103 and a server 101 to obtain the numbers N1 298 and N2 299 without departing from the scope of the present disclosure. In exemplary embodiments, the number for N1 298 or N2 299 can be either equal, or the numbers could comprise different values.

A device 103 and a server 101 could also conduct a number derivation step 297 in order to obtain the numbers N1 298 and N2 299, which is also depicted in FIG. 2c. For a number derivation step 297, a static public key can be input into a secure hash algorithm 291, such as SHA-256. The static public key can be any public key shared between a device 103 and server 101 (e.g. where one node records the public key and the other node records the corresponding private key). In exemplary embodiments depicted in FIG. 2e, the public key for a number derivation step 297 can comprise the network static public key PK.network 102a, where a server 101 can derive or calculate the network static public key can be derived from the network static private key SK.network 102b using parameters 104. Other exemplary public keys shared between device 103 and server 101 can comprise any of public keys Ed 103a, E1 101a, D1 103c, etc. The node recording the corresponding private key can calculate the public key using the parameters.

The output of the secure hash algorithm 291 can be input into a select digits function 292. The select digits function 292 could take a subset of the hash value resulting from hash 291, such as leading digits for N1 298 and trailing digits for N2 299. Or, a number N1 298 could be derived from a select digits function 292 over a hash 291 of the X coordinate of a public key and the number N2 299 could be derived by a select digits function 292 over a hash 291 of the Y coordinate of the same public key. Other subsets or logic for the select digits function 292 using the hash value from hash algorithm 291 can be used as well, without departing from the scope of the present disclosure. The output of the select digits function 292 can comprise the value N1 298 and N2 299. Since both device 103 and server 101 and/or network 105 can securely share PK.network 102a, then the same calculations for a number derivation step 297 can be performed by the nodes in order to mutually obtain the numbers N1 298 and N2 299. The values for N1 298 and N2 299 can be used by (i) device 101 when conducting the key exchange step 218n and (ii) server 101 when conducting the key derivation step 213n.

FIG. 3a

FIG. 3a is a simplified message flow diagram illustrating an exemplary system with exemplary data sent and received by a mobile device, a g node b, and a key server, in accordance with exemplary embodiments. System 301 can include a mobile device 103', a "next generation node b" 101', and a key server 102. Mobile device 103' can comprise a smart phone, a device for the "Internet of Things" (IoT), a tablet with a modem, or possibly a fixed station device that connects with a 5G or 6G network. Mobile device 103' can operate similar to a device 103, with the additional functionality of connecting to a wireless network, where the network supports 3GPP standards and can also comprise a wide area network such as a public land mobile network. A "next generation node b" 101' (depicted as gNb 101') can contain the equivalent electrical components as those depicted for a server 101 in FIG. 1b, except gNb 101' can also operate as a base transceiver station to send and receive data wirelessly with mobile device 103'. The key server 102 could operate as part of an Authentication Server Function (AUSF) or equivalent functionality. Note that the distributed nature of the ECDH key exchanges as depicted in FIG. 2a and FIG. 2b and FIG. 2c have benefits for the wireless WAN architecture in FIG. 3a, SK.network 102b for a mobile device 103' does not need to be recorded or operated by a gNb 101'

In exemplary embodiments, a mobile device 103', a gNb 101', and a key server 102 can conduct a step 222', where a step 222' can comprise primarily the step 222 as depicted and described in FIG. 2a. There can be some differences between a step 222 and a step 222'. Note that before the steps 222' depicted in FIG. 3a, a mobile device 103' and a gNb 101' could conduct steps to establish communications between the nodes, such as recording parameters for RF communications by the mobile device 103' in a SIM card or cUICC. A mobile device 103' could also conduct steps to authenticate the network 105 operating a gNb 101'. For a step 222', a mobile device 103' can send message 203 with the device ephemeral public key Ed 103a and also an obfuscated identity for device 103', where the obfuscated identity can also comprise a temporary identity for device 103. A gNb 101' can use the obfuscated identity to track the device 103 from a potential plurality of devices 103 communicating over a wireless network.

The gNb 101' can forward the device identity and the received device ephemeral public key to the key server 102. The key server 102 can look up a unique key 102v for device 103 for the network static private key 102b corresponding to the network static public key 102a recorded by the device 103. The key server 102 can calculate value X1 211a as depicted in FIG. 2b, and send the gNb 101' the value X1 211a over a secure session. The gNb 101' can conduct an ECDH key exchange step 212 and calculate value X2 212a, using the received device ephemeral public key Ed 103a and the derived server ephemeral private key e1 101b. The gNb 101' can calculate the value X3 215 via ECC point addition over X1 211a and X2 212a. The gNb 101' can calculate a symmetric ciphering key K1 216a using the value X3 215 and a KDF 216. The gNb 101' can send the mobile device 103' the derived server ephemeral public key E1 101 in a message 206c from a step 222. Note that some data within ciphertext 217b can be omitted from a message 206c in a step 222', where step 222' is depicted in FIG. 3a and comprises equivalent steps as a step 222 in FIG. 2a.

The mobile device 103' can receive the message 206c from a step 222'. The mobile device 103', gNb 101', and key server 102 can conduct a step 223, where a step 223 was depicted and described in connection with FIG. 2a above. The mobile device 103' can send gNb 101' a message 210a with ciphertext 217d, where ciphertext 217d can include a device identity ID.device 103i as plaintext encrypted in the ciphertext 217d. The ciphertext 217d can be encrypted with the derived symmetric ciphering key K1 216a and a symmetric ciphering algorithm 225, where key K1 216a was derived by mobile device 103' in a step 222'. The identity for the mobile device 103i can comprise a subscription permanent identifier (SUPI), and by transmitting the SUPI within a ciphertext 217d, the SUPI can remain confidential and not transmitted in the clear through a wireless network. Other possibilities for the use of a step 222' and a step 223 between a mobile device 103' and gNb 101' exist without departing from the scope of the present disclosure.

FIG. 3b

FIG. 3b is a simplified message flow diagram illustrating an exemplary system with exemplary data sent and received by a client, a server, and a key server, in accordance with exemplary embodiments. System 302 can include a client 103', a server comprising server 101, and a key server 102. In exemplary embodiments, client 103' can comprise a client using security steps as described in by transport layer security (TLS) sessions version 1.3 and also subsequent and related versions of IETF RFC standards. Client 103' can also comprise a client using security steps as described in datagram transport layer security (DTLS) RFC 6347 and subsequent versions that incorporate ECDH key exchanges. Although depicted in FIG. 3b as a client 103', the client 103' could also comprise a device 103, where the device 103 can conduct the steps of a client 103' at the networking, transport, and application layer of the traditional Open Systems Interconnection (OSI) model.

Client 103' can comprise a computing device that records a network static public key PK.network 102a. Note that TLS version 1.3 and DTLS version 1.3 contemplate that the client and a server can use ephemeral ECDH key exchanges (one on the client and one on the server) in order to establish a mutually derived secret shared key for a symmetric ciphering algorithm. The difference between (i) a client 103' (which can comprise a device 103 supporting TLS or DTLS standards) and (ii) a client for TLS or DTLS standards can be that client 103' can record a network static public key PK.network 102a. As depicted in FIG. 1c, the network static public key PK.network 102a could comprise either (i) a shared key 102z across a plurality of different devices 103 (or clients 103'), or (ii) a unique key 102v, where the network static public key PK.network 102a is a unique number or string or point for client 103'. The key PK.network 102a could be received by client 103' in a secure manner before a client 103' conducts a step 222 with server 101. In exemplary embodiments. PK.network 102a could be received in the form of a certificate with PK.network 102a from a prior TLS or DTLS session before client 103' begins the TLS or DTLS session depicted in FIG. 3b. Or, PK.network 102a could be recorded with a set of certificate authority certificates stored with installation of an operating system for device 103.

The use of a network static public key PK.network 102a by client 103' in a step 222 to conduct an ECDHE key exchange with server 101 can have many benefits. The standard handshake as currently proposed for TLS version 1.3 as of June 2018 assumes that a client 103' and a server 101 have no prior relationship. However, for many instances of communication between a client 103' and a server 101, the client 103' may have previously communicated with another server on a network 105 other than server 101. For example, with web browsing a web browser client such as a client 103' will often revisit the same web sites over time, such as a first web site for social networking, a second web site for a search engine, a third web site for news, etc. A TLS or a DTLS session could utilize the fact that the same sites are often re-visited in order to increase security, using the depicted steps of 222 and 223 for a client 103', server 101, and key server 102. Steps 222 in FIG. 3b can comprise the set of steps 222 depicted and described in connection with FIG. 2a, and steps 223 in FIG. 3b can also comprise the set of steps 223 depicted and described in connection with FIG. 2a.

Before conducting step 222 in FIG. 3b, a client 103' could receive key PK.network 102a from another server in network 105, such as a different web server providing functionality equivalent to server 101. PK.network 102a could also be stored or recorded by a client 103' along with a set of certificate authority certificates (including root certificates) for an operating system of advice operating the client 103'. Or, PK.network 102a could be securely received in a previous TLS or DTLS session, such as receiving PK.network 102a in a certificate verified by client 103' before client 103' conducts a step 222 in FIG. 3b. The certificate could be verified by client 103' using a certificate authority root certificate, including verification through any intermediate certificate authority certificates. The client 103' could record the network static public key PK.network 102a in a table 103t along with parameters 104a associated with PK.network 102a. In exemplary embodiments, a table 103t could include certificates such as X.509 v3 certificates for the network static public keys PK.network 102a, where the certificates include digital signatures from a certificate authority. The key PK.network 102a could also be recorded with a URL or domain name (e.g. a server name indication), such that the client 103' would use the key PK.network 102a when establishing a subsequent TLS or DTLS session with server 101, where server 101 uses the recorded URL or domain name. Further, server 101 could be configured so that any key Ed 103a received from IP network 107 on an IP address and/or port number used by server 101 would be forwarded to key server 102, where key server 102 could record and operate with the SK.network 102b corresponding to the public key for PK.network 102a recorded by client 103'. Server 101 could also operate such that a URL is associated with a key server 102 and/or PK.network 102a, such that a call or request of the URL could be used to select the key server 102 and/or PK.network 102a.

For a step 222, a client 103' can (i) derive a device ephemeral public key Ed 103a and private key ed 103b using parameters 104a stored with PK.network 102a and (ii) send server 101 a message 203. The message 203 can include the key Ed 103a and the set of cryptographic parameters 104a associated with Ed 103a. In some exemplary embodiments client 103' implements TLS or DTLS, and message 203 can optionally omit a device identity ID.device 103i. Server 101 could operate in a manner such that (i) Ed 103a is forwarded to key server 102, and (ii) server 101 derives an ephemeral PKI key pair. Key server 102 can conduct an ECDHE key exchange as depicted for a step 222 in FIG. 2a using a step 211 in order to calculate the secret value X1 211a. Key server 102 can send server 101 the value X1 211a. Server 101 can use the value X1 211a, along with the derivation of a second secret X2 212a in order to calculate a symmetric ciphering key K1 216a, using the key derivation step 213 with ECC point addition 214 over X1 211a and X2 212a. Thus, by using the embodiment depicted in FIG. 3b, a transport layer security session can have security increased, where (a) the ECDHE key exchange contemplated by TLS v1.3 (which would be key exchange 212 in FIG. 2b) can also add (b) the additional key exchange step 211a by a key server 102. Note that the mutual derivation of symmetric ciphering key K1 216a by client 103' and server 101 can comprise a one-way authentication of server 101, since server 101 can only derive the key K1 216a if server 101 operates in a network 105 that also records and operates with key SK.network 102b.

The server 101 can send the client 103' the derived server ephemeral public key E1 101a in a message 206c from a step 222. Key E1 101a could be derived by a step (ii) in the above paragraph. Message 206c could comprise a "Server Hello" according to TLS v1.3 in the document "draft-ietf-tls-tls 13-28". The ciphertext in the Server Hello can be ciphertext 217b as depicted in FIG. 2a, where the ciphertext 217a is encrypted with the mutually derived symmetric ciphering key K1 216a. Note that a step 222 for FIG. 3b increases security for a TLS session, since an active attacker could operate as a "man in the middle" between a real client or "true client" and the server 101, where the "man in the middle" could derive its own key Ed 103a and substitute that for the real key Ed 103a from the real client or "true client". Without use of a PK.network 102a, a "man in the middle" (deriving and substituting a key Ed 103a) could (a) mutually derive a symmetric ciphering key similar to K1 216a with server 101 and then (b) receive and decrypt the ciphertext 217b. However, the use of PK.network 102a can stop a "man in the middle" attack since a "man in the middle" cannot derive key K1 216a without also recording the SK.network 102b, which can remain secret and not available to the "man in the middle".

The client 103' can receive the message 206c from a step 222 from a server 101. The client 103', server 101, and key server 102 can conduct a step 223, where a step 223 was depicted and described in connection with FIG. 2a above. The client 103' can derive the same key K1 216c using a step 218 and the PK.network 102a. The client 103' can decrypt ciphertext 217b using key K1 216a. The client 103' can process the plaintext data, such as recording a certificate for server 101 (e.g. cert.server 101c from FIG. 2a), and verifying a signature 101s from server 101. The client can also read a random number transmitted in the ciphertext 217b and create a digital signature over the random number. The client can encrypt a ciphertext 217d with data to respond to server 101. The ciphertext 217d can be encrypted with the derived symmetric ciphering key K1 216b and a symmetric ciphering algorithm 211a, where key K1 216a was derived by client 103' in a step 223. Other possibilities exist for the use of a step 222 and a step 223 between a client 103' and server 101 without departing from the scope of the present disclosure.

For the exemplary embodiment depicted in FIG. 3b for support of TLS and DTLS secured data sessions, a message 203 can comprise a "client hello" message, a message 206c can comprise a "server hello" message, and message 210a can comprise a "finished" message from the client 103". For exemplary embodiments, message 203 as a "client hello" message can omit a device identity 103i (such as a permanent identifier for client 103' or device 103, but the "client hello" message could include other identifying information for client 103' such as (i) an originating IP address and source port number for message 203, (ii) an obfuscated and/or temporary identity such as a random number for a session, and other possibilities exist as well without departing from the scope of the present disclosure.

In addition, embodiments depicted in FIG. 3b solve a significant challenge for resource constrained devices to fully authenticate a certificate cert, server 101c. There could be many layers of intermediate certificates between cert.server 101c and a certificate authority root certificate stored in device 103. Checking for certificate validity for all intermediate certificates and for revocation or OSCP signatures and/or stapling could add many levels of signature verifications. ARM reported a 32 Cortex M4 processor with 32 bits and operating at 84 Mhz requires ~420 ms for a single ECDSA signature verification (secp521r1) ("Performance of State-of-the-Art Cryptography on ARM-based Microprocessors", Jul. 21, 2015). There could be 8 or more signatures to be verified for a full certificate chain verification of cert.server 101c and related OSCP signatures. A device could conduct the single authenticated key exchange step 218 in less than 15% of the time and power required for the full, traditional certificate chain verification. Also, there are reduced chances for errors due to unsupported parameters for (x) a single authenticated ECDH key exchange step compared to (y) multiple certificate verifications steps with OSCP verification. Consequently, the communications for a TLS session or DTLS session can remain secured more efficiently using a step 222 and step 223, while recording and using (i) SK.network 102b with network 105 and (ii) PK.network 102a with client 103', compared to traditional TLS or DTLS implementations with multiple layers of certificate authorities through root certificates.

FIG. 3c

Figure 3C:
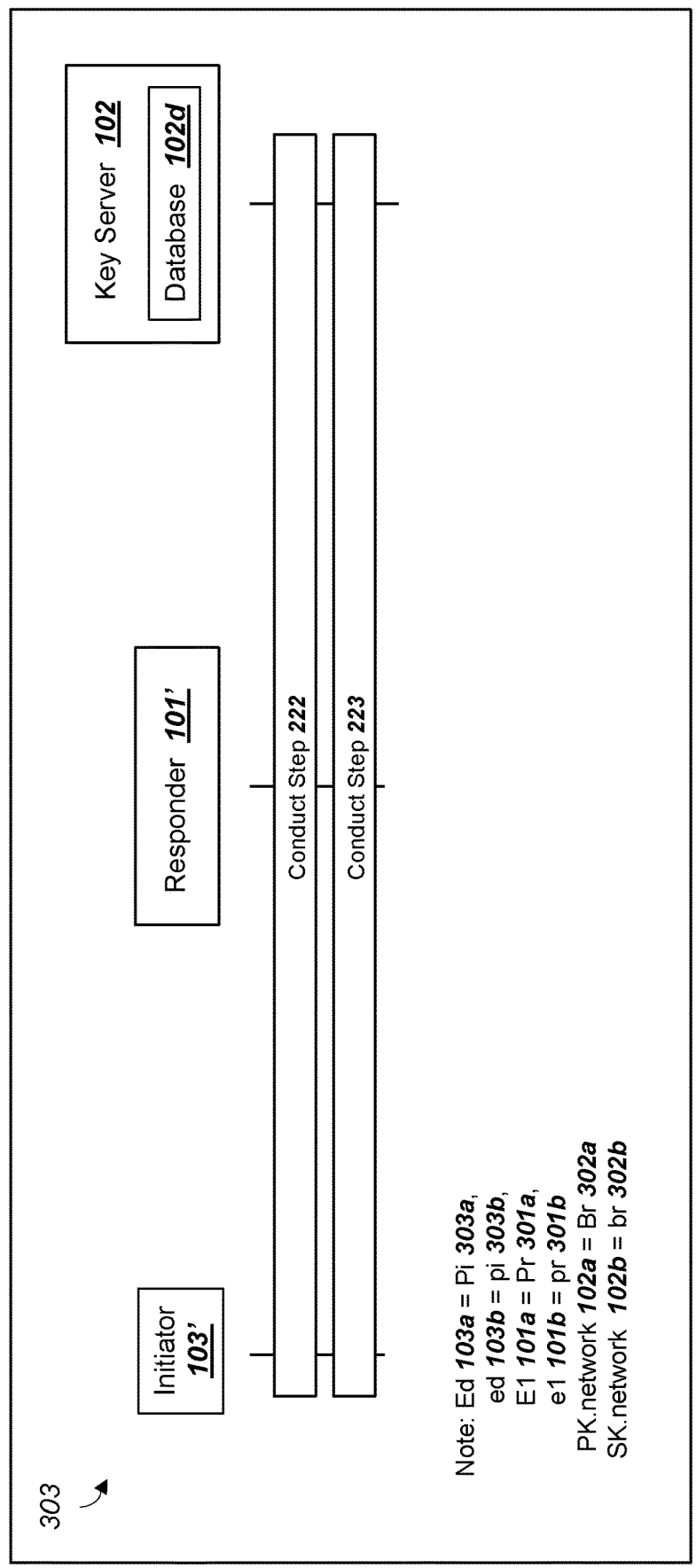
FIG. 3a is a simplified message flow diagram illustrating an exemplary system with exemplary data sent and received by a mobile device, a "g node b", and a key server, in accordance with exemplary embodiments.
FIG. 3b is a simplified message flow diagram illustrating an exemplary system with exemplary data sent and received by a client, a server, and a key server, in accordance with exemplary embodiments; and, FIG. 3c is a simplified message flow diagram illustrating an exemplary system with exemplary data sent and received by an initiator, a responder, and a key server, in accordance with exemplary embodiments.

FIG. 3c is a simplified message flow diagram illustrating an exemplary system with exemplary data sent and received by an initiator, a responder, and a key server, in accordance with exemplary embodiments. System 303 can include an initiator 103', a responder 101' and a key server 102. Initiator 103' can comprise a computing device 103, with the specific additional functionality of an initiator according to the DPP Specification Versions 1.0 from the WiFi Alliance. Responder 101' can comprise a device with (i) electrical components similar or equivalent to a server 101 depicted in FIG. 1b above, and (ii) the specific additional functionality of a responder according to the DPP Specification Version 1.0 of the WiFi Alliance. For example, initiator 103' and responder 101' can communicate via a WiFi network on a LAN between the two devices, which could also comprise the IP network 107. Responder 101' can operate in a networked configuration to communicate with key server 102 via a private network 107*a* or a secure session 221 as depicted in FIG. 2*a*. In some embodiments, responder 101' can communicate with key server 102 via an IP network 107, where the use of secure session 221 can create a private network 107*a* between responder 101' and key server 102.

An initiator 103', responder 101' and a key server 102 can conduct a step 222, where a step 222 is depicted and described in connection with FIG. 2*a* above. An initiator 103', responder 101' and a key server 102 can then conduct a step 223, where a step 223 is depicted and described in connection with FIG. 2*a* above. As depicted in FIG. 3*c*, several PKI keys within a DPP specification version 1.0 can have corresponding keys for a step 222 and step 223. Note that additional steps in addition to those depicted in FIG. 3*c* can be conducted by an initiator 103' and a responder 101', such as responder 101' deriving PKI keys in a step 101*x* from FIG. 1*a* and also conducting additional ECDH key exchanges in order to derive a symmetric ciphering key ke in addition to symmetric ciphering key K1 216*a*. In other words, initiator 103' and responder 101' could perform additional ciphering than that depicted for a step 222 in FIG. 2*a*, but for exemplary embodiments such as that depicted in FIG. 3*c* the initiator 103' and responder 101' could conduct at least the steps depicted in order to mutually derive a symmetric ciphering key K1 216*a* and use the key to create a ciphertext 217*b* by responder 101' and decrypt the ciphertext 217*b* by initiator 103'.

As depicted in FIG. 3*c*, the device ephemeral public key Ed 103*a* can comprise the initiator protocol public key Pi 303*a*. The device ephemeral private key ed 103*b* can comprise the initiator protocol private key pi 303*b*. The server ephemeral public key E1 101*a* can comprise the responder protocol public key Pr 301*a*. The server ephemeral private key e1 101*b* can comprise the responder protocol private key pr 301*b*. The network static public key PK.network 102*a* can comprise the responder bootstrap public key 302*a*. The network static private key SK.network 102*b* can comprise the responder bootstrap private key 302*b*. As described below, other steps from FIG. 2*a* can be equivalent to those depicted in FIG. 3*c*.

For a message 203 sent from initiator 103' to responder 101', the message 203 with the key Pi 303*a* can also include a ciphertext. The message 203 in a step 222 can comprise a "DPP Authentication Request" message from the DPP v1.0 standard. Responder 101' can communicate with key server 102 and receive the value X1 211*a*. Responder 101' can also derive the server ephemeral public key E1 101 (comprising the responder protocol public key Pr 301*a*) and the server ephemeral private key e1 101*b* (comprising the responder protocol private key pr 301*b*). The Responder 101' can use KDF 216 to convert X1 211*a* into a symmetric encryption key (which can be different than key K1 216*a* from Figures above). Responder 101' can use the symmetric encryption key from X1 211*a* to decrypt the ciphertext with a message 203. Responder 101' can then conduct the key exchange step 212 and step 213, along with modified versions of KDF 216 in order to derive a key ke. Responder 101' can encrypt data with the key ke and send initiator 103' a message 206*c* with the encrypted data. The message 206*c* can comprise a "DPP Authentication Response" message from the DPP v1.0 standard. Initiator 103' can then send responder 101' a "DPP Configuration Request" message, which could comprise message 210*a* in a step 223 as depicted in FIG. 2*a*.

A benefit for the use of a step 222 and step 223 for an initiator 103' and a responder 101' is that the responder bootstrap private key br 302*b* can remain securely recorded in a network 105 and does not need to be recorded and operated by responder 101. In this manner, the responder bootstrap public key Br 302*a* can be freely shared with multiple different initiators 103', including recording the key Br 302*a* in a plurality of initiators 103' in the form of a shared key 102*z* as depicted in FIG. 1*c*. The use of a shared key 102*z* with multiple different initiators 103" (while keeping SK.network 102*b* or key br 302*b* securely recorded in a key server 102) simplifies the distribution of key Br 302*a* to multiple different initiators 103".

For exemplary embodiments, the initiators 103' could have a key Br 302*a* recorded during manufacturing or distribution of the computing device operating initiator 103'. In other words, a device manufacturer upon device manufacturing with initiator 103' may not know which responder 101' may communicate with initiator 103' during a subsequent DPP session. However, a manufacturer of device with initiator 103' could record a plurality of different keys Br 302*a* for different networks 105 (similar to different keys PK.network 102*a* in for a table 103*t* FIG. 1*c*), and in this manner initiator 103' can have a higher probability of successfully using a pre-recorded key Br 302*a* (or key PK.network 102*a*) in order to conduct a DPP session without requiring a separate or different additional step of acquiring the key Br 302*a* "out of band". Thus, the use of the embodiment for an initiator 103' and a responder 101' can simplify the use and deployment of DPP sessions, while simultaneously increasing the securing of the session, since the responder bootstrap private key br 302*b* (in the form of SK.network 102*b*) can remain securely recorded within a network 105 on a key server 102.

CONCLUSION

Various exemplary embodiments have been described above. Those skilled in the art will understand, however, that changes and modifications may be made to those examples without departing from the scope of the claims.

The invention claimed is:
1. A method for a device to authenticate with a server over a wireless network, the method performed by the device, the method comprising:
   a) storing, in a memory, (i) a first point on an elliptic curve, and (ii) a shared key, wherein the shared key is received by the server;
   b) generating a value from a secure hash of at least the shared key;
   c) selecting a first integer as a first subset of the value;
   d) receiving, from the server via a radio connected to the wireless network, (i) a random number and (ii) a second point on the elliptic curve, the second point comprising a public key for the server;
   e) deriving a device private key and corresponding device public key for the elliptic curve;
   f) deriving a shared secret comprising an elliptic curve point addition of (i) the first integer multiplied by the first point and (ii) the device private key multiplied by the public key for the server;
   g) deriving a symmetric ciphering key from a key derivation function with the shared secret;
   h) generating a ciphertext by encrypting with the symmetric key (i) a device digital signature for at least the random number, and (ii) a device certificate; and i) transmitting, to the server via the radio connected to the wireless network, the ciphertext.

2. The method of claim 1, wherein the elliptic curve comprises a named curve secp256r1 (p256).

3. The method of claim 1, wherein the first integer comprises a second value N2.

4. The method of claim 1, wherein the symmetric ciphering key comprises a third value K1.

5. The method of claim 1, wherein the server mutually derives the shared secret and the symmetric ciphering key using the first point, the shared secret, the first integer, the device public key, and a server private key corresponding to the server public key.

6. The method of claim 1, further comprising after step e) and before step i), transmitting, to the server via the radio connected to the wireless network, the device public key.

7. The method of claim 1, further comprising in step f) deriving a message authentication code (MAC) key from the key derivation function with the shared secret and in step h) generating a MAC value for the ciphertext with the MAC key.

8. The method of claim 1, further comprising step j) receiving, from the server via the radio connected to the wireless network, a second ciphertext comprising a server certificate, wherein the device decrypts the second ciphertext using the symmetric key.

9. The method of claim 1, further comprising in step h), generating the device digital signature using an elliptic curve digital signature algorithm (ECDSA).

10. The method of claim 1, wherein the server verifies the digital signature using the device certificate.

11. The method of claim 1, wherein multiplication in step f) comprises elliptic curve point multiplication.

12. The method of claim 1, wherein the device comprises the radio.

13. The method of claim 1, wherein the wireless network comprises a Wi-Fi network.

* * * * *